United States Patent
Kawahira et al.

(10) Patent No.: US 10,670,911 B2
(45) Date of Patent: *Jun. 2, 2020

(54) LIQUID CRYSTAL DISPLAY PANEL AND LIQUID CRYSTAL DISPLAY DEVICE

(71) Applicant: SHARP KABUSHIKI KAISHA, Sakai, Osaka (JP)

(72) Inventors: Yuichi Kawahira, Sakai (JP); Akira Sakai, Sakai (JP); Kozo Nakamura, Sakai (JP); Masahiro Hasegawa, Sakai (JP); Takako Koide, Sakai (JP); Koji Murata, Sakai (JP); Kiyoshi Minoura, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/303,016

(22) PCT Filed: May 16, 2017

(86) PCT No.: PCT/JP2017/018351
§ 371 (c)(1),
(2) Date: Nov. 19, 2018

(87) PCT Pub. No.: WO2017/199948
PCT Pub. Date: Nov. 23, 2017

(65) Prior Publication Data
US 2019/0293997 A1    Sep. 26, 2019

(30) Foreign Application Priority Data
May 20, 2016 (JP) ................................ 2016-101552

(51) Int. Cl.
*G02F 1/1335* (2006.01)
*G02F 1/13363* (2006.01)
(Continued)

(52) U.S. Cl.
CPC ......... *G02F 1/133528* (2013.01); *G02B 5/20* (2013.01); *G02B 5/30* (2013.01);
(Continued)

(58) Field of Classification Search
CPC ......... G02F 1/133528; G02F 1/133512; G02F 1/1337; G02F 1/13394; G02F 2413/02; G02F 2001/133638; G02F 1/134363
See application file for complete search history.

(56) References Cited

U.S. PATENT DOCUMENTS

2011/0007252 A1 *  1/2011  Hashimoto ......... G02F 1/13363
                                                   349/114
2012/0218497 A1 *  8/2012  Kajita ............... G02F 1/134363
                                                   349/98
(Continued)

FOREIGN PATENT DOCUMENTS

JP      2008-026587 A    2/2008
JP      2008-083492 A    4/2008
(Continued)

OTHER PUBLICATIONS

H. Imayama et al. 57.1: Novel Pixel Design for a Transflective IPS-LCD with an In-Cell Retarder, SID 07 Digest, p. 1651-1654.

*Primary Examiner* — Paisley L Wilson
*Assistant Examiner* — Mariam Qureshi
(74) *Attorney, Agent, or Firm* — ScienBiziP, P.C.

(57) ABSTRACT

The liquid crystal display panel includes: a first polarizing plate; a first λ/4 plate; a first substrate; a second λ/4 plate; a liquid crystal layer; a second substrate; and a second polarizing plate, wherein the first substrate includes a black matrix, and a photo spacer overlapping with the black matrix, d crystal molecules in the liquid crystal layer homogeneously align with no voltage application, the second λ/4 plate is made of a self-assembling photo alignment material containing a photo functional group capable of causing at
(Continued)

least one chemical reaction selected from the group consisting of photodimerization, photoisomerization, and photo-Fries rearrangement, and covers a side surface of the photo spacer, and the in-plane stow axis of the first λ/4 plate forms an angle of 45° with the transmission axis of the first polarizing plate and is orthogonal to the in-plane slow axis of the second λ/4 plate.

4 Claims, 13 Drawing Sheets

(51) Int. Cl.
  *G02F 1/1337* (2006.01)
  *G02F 1/1339* (2006.01)
  *G02F 1/1333* (2006.01)
  *G02B 5/20* (2006.01)
  *G02B 5/30* (2006.01)

(52) U.S. Cl.
  CPC .......... *G02F 1/1333* (2013.01); *G02F 1/1335* (2013.01); *G02F 1/1337* (2013.01); *G02F 1/1339* (2013.01); *G02F 1/13363* (2013.01); *G02F 1/13394* (2013.01); *G02F 1/133512* (2013.01); *G02F 2001/13398* (2013.01); *G02F 2001/133531* (2013.01); *G02F 2001/133638* (2013.01); *G02F 2001/133738* (2013.01); *G02F 2413/02* (2013.01); *G02F 2413/05* (2013.01)

(56) References Cited

U.S. PATENT DOCUMENTS

2018/0088379 A1* 3/2018 Fan .................. H01L 33/26
2019/0121186 A1* 4/2019 Miura ................ G02F 1/13392

FOREIGN PATENT DOCUMENTS

| JP | 2012-173672 A | 9/2012 |
| JP | 2014-034631 A | 2/2014 |

* cited by examiner

Distance from end part of photo spacer (μm)

Distance from end part of photo spacer (μm)

Distance from end part of photo spacer (μm)

Distance from end part of photo spacer (μm)

LIQUID CRYSTAL DISPLAY PANEL AND LIQUID CRYSTAL DISPLAY DEVICE

TECHNICAL FIELD

The present invention relates to a liquid crystal display panel and a liquid crystal display device. The present invention particularly relates to a horizontal electric field mode liquid crystal display panel including a photo spacer, and a liquid crystal display device including the liquid crystal display panel.

BACKGROUND ART

Liquid crystal display panels have been used not only for televisions but also for smartphones, tablet PCs, car navigation systems, and the like. Various kinds of capabilities are requested for these applications, and for example, liquid crystal display panels supposed to be used at bright places such as outdoors have been disclosed (refer to Patent Literature 1 and Non Patent Literature 1, for example).

CITATION LIST

Patent Literature

Patent Literature 1: JP 2012-173672 A

Non Patent Literature

Non Patent Literature 1: Imayama et al., "Novel Pixel Design for a Transflective IPS-LCD with an In-Cell Retarder", SID07 DIGEST, 2007, pp. 1651 to 1654

SUMMARY OF INVENTION

Technical Problem

In some conventional liquid crystal display panels, a circular polarizing plate (laminated body of a linear polarizing plate and a λ/4 plate) is disposed on an observation surface side of a substrate provided on the observation surface side between paired substrates with a liquid crystal layer interposed therebetween to increase visibility at a bright place such as outdoor (reduce external light reflection). For example, in a known configuration, a vertical alignment (VA) mode liquid crystal display panel includes a circular polarizing plate, but the VA mode liquid crystal display panel has a viewing angle narrower than those of liquid crystal display panels of horizontal electric field modes such as the in-plane switching (IPS) mode and the fringe field switching (FFS) mode, and thus does not have wide applications. The liquid crystal display panel of a horizontal electric field mode such as the IPS mode or the FFS mode has an excellent viewing angle characteristic, and is difficult to be provided with a circular polarizing plate. This is because, when circular polarizing plates are disposed on the observation surface side and back surface side of the horizontal electric field mode liquid crystal display panel, the liquid crystal display panel is constantly in a white (bright) display state with no voltage application or with voltage application, and it is unable to achieve a black (dark) display state.

Patent Literature 1 and Non Patent Literature 1 each disclose a configuration in which a retarder (hereinafter also referred to as an in-cell retarder) is disposed on a liquid crystal layer side of a substrate on an observation surface side between paired substrates with a liquid crystal layer interposed therebetween. However, in the configurations disclosed in Patent Literature 1 and Non Patent Literature 1, when a substrate (for example, a color filter substrate), on a surface of which on the liquid crystal layer side a photo spacer is disposed is used as the substrate on the observation surface side, light leakage occurs in the vicinity of the photo spacer, which results in contrast ratio reduction in some cases.

The inventors of the present invention made various studies on this cause and found out the followings. The in-cell retarder is formed by, for example, applying a liquid crystalline photopolymerizable material (liquid crystalline photopolymerizable monomer) to the liquid crystal layer side surface of the substrate on the observation surface side. In this case, the thickness of the liquid crystalline photopolymerizable material increases as the position approaches the photo spacer from a pixel region. Thus, even when the retardation (product of the refractive index anisotropy and the thickness) of the in-cell retarder is set to an optimum value in the pixel region (region in which the liquid crystalline photopolymerizable material is applied flat), the retardation deviates from the optimum value in the vicinity of the photo spacer due to the increased thickness. Accordingly, the retardation applied by the in-cell retarder is largely different between the pixel region and the vicinity of the photo spacer, and thus light leakage occurs in the vicinity of the photo spacer when observed through the above-described circular polarizing plate, which results in contrast ratio reduction. When the liquid crystal display panel is viewed from the observation surface side, the photo spacer is normally hidden by a black matrix, but light leakage in the vicinity of the photo spacer cannot be hidden by the black matrix in a normal size and is visually recognized.

In view of the above state of the art, it is an object of the present invention to provide a horizontal electric field mode liquid crystal display panel having excellent visibility at a bright place and reduced light leakage in the vicinity of a photo spacer, and a liquid crystal display device including the liquid crystal display panel.

Solution to Problem

The present inventors made various discussions concerning a horizontal electric field mode liquid crystal display panel having excellent visibility at a bright place and reduced light leakage in the vicinity of a photo spacer, and consequently have noted a configuration in which a circular polarizing plate is disposed on an observation surface side and a retardation applied by an in-cell retarder does not change with the position. Accordingly, the inventors have found a configuration in which a first λ/4 plate and a first polarizing plate are sequentially disposed on an observation surface side of a first substrate including a photo spacer, which is the observation surface side substrate of paired substrates with a liquid crystal layer interposed therebetween, a second λ/4 plate is disposed on a back surface side (liquid crystal layer side) of the first substrate, and a material, the retardation of which hardly depends on the thickness, is used as the material of the second λ/4 plate. These findings have now led to completion of the present invention capable of solving the above-described problem.

Specifically, an aspect of the present invention may be a liquid crystal display panel including, sequentially from an observation surface side toward a back surface side: a first polarizing plate; a first λ/4 plate; a first substrate; a second λ/4 plate; a liquid crystal layer; a second substrate; and a second polarizing plate. One of the first substrate and the second substrate includes a pair of electrodes configured to generate a horizontal electric field at the liquid crystal layer upon voltage application. The first substrate includes a black matrix, and a photo spacer disposed on the back surface side of the black matrix and overlapping with the black matrix. Liquid crystal molecules in the liquid crystal layer homogeneously align with no voltage application between the electrodes. The second λ/4 plate is made of a self-assembling photo alignment material containing a photo functional group capable of causing at least one chemical reaction selected from the group consisting of photodimerization, photoisomerization, and photo-Fries rearrangement, and covers a side surface of the photo spacer. The in-plane slow axis of the first λ/4 plate forms an angle of 45° with the transmission axis of the first polarizing plate and is orthogonal to the in-plane slow axis of the second λ/4 plate.

Another aspect of the present invention may be a liquid crystal display device including the liquid crystal display panel.

Advantageous Effects of Invention

The present invention provides a horizontal electric field mode liquid crystal display panel having excellent visibility at a bright place and reduced light leakage in the vicinity of a photo spacer, and a liquid crystal display device including the liquid crystal display panel.

DESCRIPTION OF EMBODIMENT

Embodiment of the present invention will be described further in detail below with reference to the accompanying drawings, but the present invention is not limited to the embodiment. Configurations of the embodiment may be combined or changed as appropriate without departing from the scope of the present invention.

In the present specification, a "polarizing plate" without "linear" means a linear polarizing plate and is distinguished from a circular polarizing plate.

In the present specification, a λ/4 plate means a retarder that provides an in-plane retardation of ¼ wavelength (137.5 nm, precisely) to at least light having a wavelength of 550 nm, and includes a retarder that provides an in-plane retardation of 100 nm or more and 176 nm or less. Light having a wavelength of 550 nm is light of a wavelength at which a human has highest visual sensitivity.

In the present specification, an in-plane retardation (R) is defined to be R=(ns−nf)×D. When nx and ny are defined to be the principal refractive indexes of a retarder (including a λ/4 plate) in the in-plane direction, ns represents the larger one of nx and ny, and nf represents the smaller one. The in-plane slow axis is an axis in the direction corresponding to ns, and the in-plane fast axis is an axis in the direction corresponding to nf. The thickness of the retarder is represented by D.

In the present specification, the retardation of a liquid crystal layer means the maximum value of an effective retardation provided by the liquid crystal layer, and is defined to be Δn×d where Δn and d represent the refractive index anisotropy and thickness of the liquid crystal layer, respectively.

In the present specification, when two axes (directions) are orthogonal to each other, the angle (absolute value) between the axes is in the range of 90±3°, preferably in the range of 90±1°, more preferably in the range of 90±0.50, particularly preferably equal to 90° (completely orthogonal to each other). When two axes (directions) are parallel to each other, the angle (absolute value) between the axes is in the range of 0±3°, preferably in the range of 0±10, more preferably in the range of 0±0.5°, particularly preferably equal to 00 (completely parallel to each other). When two axes (directions) form an angle of 45°, the angle (absolute value) between the axes is in the range of 45±3°, preferably in the range of 45±1°, more preferably in the range of 45±0.5°, particularly preferably equal to 45° (perfect 45°).

Embodiment

Figure 1:
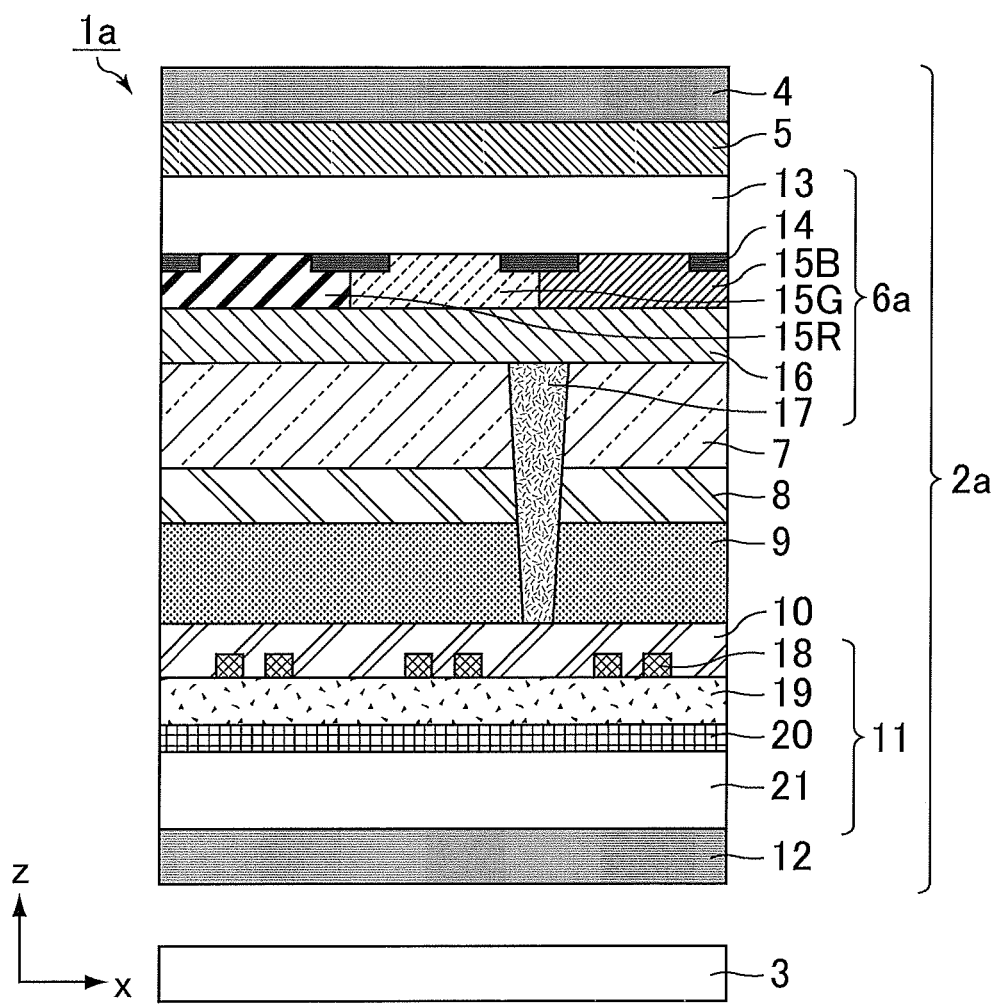
FIG. 1 is a schematic cross-sectional view illustrating a liquid crystal display device according to an embodiment.

FIG. 1 is a schematic cross-sectional view illustrating a liquid crystal display device according to an embodiment.

As illustrated in FIG. 1, this liquid crystal display device 1a includes a liquid crystal display panel 2a and a backlight 3 sequentially from an observation surface side toward a back surface side.

The type of the backlight 3 is not limited, and an edge-lit type or direct-lit type backlight may be employed, for example. The type of a light source of the backlight 3 is not limited, but may be, for example, a light-emitting diode (LED) or a cold cathode fluorescent lamp (CCFL).

The liquid crystal display panel 2a includes sequentially from the observation surface side toward the back surface side, a first polarizing plate 4, a first λ/4 plate 5, a first substrate 6a, a second λ/4 plate 7, a first alignment film 8, a liquid crystal layer 9, a second alignment film 10, a second substrate 11, and a second polarizing plate 12.

The first polarizing plate 4 and the second polarizing plate 12 may be each, for example, a polarizer (absorption polarizing plate) obtained by causing an anisotropic material such as iodine complex (or dye) to dye and adsorb on a polyvinyl alcohol (PVA) film and then stretching and aligning the film.

The first polarizing plate 4 and the second polarizing plate 12 preferably have transmission axes orthogonal to each other. With this configuration, the first polarizing plate 4 and the second polarizing plate 12 are disposed in crossed Nicols, and thus a preferable black display state can be achieved with no voltage application.

The first substrate 6a includes a black matrix 14, and a photo spacer 17 disposed on the back surface side of the black matrix 14 and overlapping with the black matrix 14. FIG. 1 exemplarily illustrates a case in which the first substrate 6a is a color filter substrate.

The first substrate 6a includes a first support substrate 13, the black matrix 14 disposed on a surface of the first support substrate 13 on the back surface side, color filter layers 15R (red), 15G (green), and 15B (blue) covering the black matrix 14, an overcoat layer 16 covering the color filter layers 15R, 15G, and 15B, and the photo spacer 17 disposed on a surface of the overcoat layer 16 on the back surface side. The photo spacer 17 overlaps with the black matrix 14. With this configuration, when the liquid crystal display panel 2a is viewed from the observation surface side, the photo spacer 17 is hidden by the black matrix 14 and not visually recognized.

The first support substrate 13 is, for example, a glass substrate or a plastic substrate.

The black matrix 14 is made of, for example, a black resist having a light shielding ratio of 99.9% or higher (an OD value of 3.0 or larger).

The color filter layers 15R, 15G, and 15B are made of, for example, a pigment dispersion type color resist. The color filter layers are not limited to a particular color combination, but may be, for example, a combination of red, green, and blue as illustrated in FIG. 1, or a combination of red, green, blue, and yellow.

The overcoat layer 16 is made of, for example, a transparent resin having high thermal and chemical resistance.

The photo spacer 17 provides a gap (cell gap) between the first substrate 6a and the second substrate 11. The photo spacer 17 is made of, for example, a resist. The height of the photo spacer 17 is set as appropriate with taken into account the thickness of the second λ/4 plate 7 and the thickness of the liquid crystal layer 9 (more precisely, the thickness of the first alignment film 8 as well). When the height of the photo spacer 17 is low, in other words, the thickness of the liquid crystal layer 9 is small, light scattering through the liquid crystal layer 9 in the black display state (with no voltage application) is reduced, and thus the liquid crystal display panel achieves high contrast. When the height of the photo spacer 17 is low, a reduced amount of material is used for the liquid crystal layer 9, thereby achieving cost reduction. The sectional shape of the photo spacer 17 is not limited but may be, for example, a shape thickening from the observation surface side toward the back surface side or a shape having a constant width in addition to a shape narrowing from the observation surface side toward the back surface side as illustrated in FIG. 1.

One of the first substrate 6a and the second substrate 11 includes a pair of electrodes configured to generate a horizontal electric field at the liquid crystal layer 9 upon voltage application. FIG. 1 exemplarily illustrates a case in which the second substrate 11 is an FFS mode thin-film transistor array substrate.

The second substrate 11 includes a second support substrate 21, a common electrode 20 disposed on a surface of the second support substrate 21 on the observation surface side, an insulating film 19 covering the common electrode 20, and a pixel electrode (signal electrode) 18 disposed on a surface of the insulating film 19 on the observation surface side. With this configuration, when voltage is applied between the common electrode 20 and the pixel electrode 18 (upon voltage application), a horizontal electric field (fringe electric field) is generated at the liquid crystal layer 9 so that alignment of liquid crystal molecules in the liquid crystal layer 9 can be controlled.

The second support substrate 21 is, for example, a glass substrate or a plastic substrate.

The common electrode 20 is a planar electrode. The material of the common electrode 20 is, for example, indium tin oxide (ITO) or indium zinc oxide (IZO).

The insulating film 19 is, for example, an organic insulating film or a nitride film.

The pixel electrode 18 is an electrode provided with a slit. The material of the pixel electrode 18 is, for example, indium tin oxide (ITO) or indium zinc oxide (IZO).

The case in which the second substrate 11 is an FFS mode thin-film transistor array substrate is exemplarily described above. In an IPS mode thin-film transistor array substrate in the same horizontal electric field mode, when voltage is applied between paired comb teeth electrodes (upon voltage application), a horizontal electric field is generated at the liquid crystal layer 9 so that alignment of the liquid crystal molecules in the liquid crystal layer 9 can be controlled.

The liquid crystal molecules in the liquid crystal layer 9 homogeneously align when no voltage is applied between the electrodes included in one of the first substrate 6a and the second substrate 11 (in FIG. 1, between the common electrode 20 and the pixel electrode 18) (with no voltage application). The liquid crystal layer 9 is made of, for example, a negative type liquid crystal material having negative anisotropy of dielectric constant ($\Delta\varepsilon<0$).

The second λ/4 plate 7 is made of a self-assembling photo alignment material containing a photo functional group capable of causing at least one chemical reaction selected from the group consisting of photodimerization, photoisomerization, and photo-Fries rearrangement. In the self-assembling photo alignment material, the alignment property of the photo functional group is improved by the following method. First, the self-assembling photo alignment material is applied to a substrate (for example, the first substrate 6a) to form a photo alignment material film. Then, the photo alignment material film is pre-baked. Subsequently, the pre-baked photo alignment material film is irradiated with light (for example, polarized ultraviolet) to cause chemical reaction (at least one chemical reaction selected from the group consisting of photodimerization, photoisomerization, and photo-Fries rearrangement) of the photo functional group. Lastly, the photo alignment material film subjected to the light irradiation is post-baked at a temperature higher than that of the pre-baking so that the alignment property of the photo functional group is improved through the chemical reaction caused by the light irradiation.

Examples of photo functional groups capable of causing photodimerization and photoisomerization include a cinnamate group, a chalcone group, a coumarin group, and a stilbene group.

Examples of photo functional groups capable of causing photoisomerization include an azobenzene group.

Examples of photo functional groups capable of causing photo-Fries rearrangement include a phenol ester group.

Examples of the main skeleton of the self-assembling photo alignment material (solid content) include polyamic acid, polyimide, acrylic, methacrylic, maleimide, and polysiloxane structures.

The self-assembling photo alignment material functions as an alignment film for defining the alignment direction of the liquid crystal molecules, and also functions as a retarder (including a λ/4 plate). Table 1 exemplarily lists in-plane retardations developed by alignment materials (solid contents). In Table 1, each in-plane retardation is a value for light having a wavelength of 550 nm when the thickness of an alignment material is 100 nm. As indicated in Table 1, alignment materials E, F, G, and H develop in-plane retardations larger than those of alignment materials A, B, C, and D, and each function as a retarder (including a λ/4 plate) by increasing the thickness thereof (to, for example, 1 μm or larger). In other words, the alignment materials E, F, G, and H are self-assembling photo alignment materials.

TABLE 1

|  | Alignment type | Post-baking after light irradiation | In-plane retardation (nm) |
| --- | --- | --- | --- |
| Alignment material A | Rubbing type | No | 0.1 |
| Alignment material B | Photolytic type | No | 0.8 |
| Alignment material C | Photolytic type | Yes | 0.5 |
| Alignment material D | Photoisomerization type | No | 0.1 |
| Alignment material E | Photoisomerization type | Yes | 1.8 |
| Alignment material F | Photoisomerization type | Yes | 15 |
| Alignment material G | Photo-Fries rearrangement type | Yes | 5 |
| Alignment material H | Photo-Fries rearrangement type | Yes | 21 |

The refractive index anisotropy of the self-assembling photo alignment material is determined mainly in accordance with the light irradiation and post-baking processes (for example, the amount of the light irradiation and the temperature of the post-baking). Thus, when the self-assembling photo alignment material is used, the in-plane retardation is unlikely to change due to a small change (for example, a change of ±0.10 μm approximately from a designed value) in the thickness. Accordingly, when the thickness increases from a pixel region toward the photo spacer 17, the in-plane retardation of the second λ/4 plate 7 does not largely differ between the pixel region and the vicinity of the photo spacer 17, and thus light leakage in the vicinity of the photo spacer 17 can be reduced when the second λ/4 plate 7 is used in combination with the black matrix 14.

The second λ/4 plate 7 covers a side surface of the photo spacer 17. Such a state is achieved by applying the self-assembling photo alignment material on a surface of the first substrate 6a on the back surface side after the photo spacer 17 is formed in the first substrate 6a. However, when the photo spacer 17 is formed only on the second substrate 11 unlike the present embodiment, the second λ/4 plate 7 does not cover the side surface of the photo spacer 17. The second λ/4 plate 7 only needs to cover at least part of the side surface of the photo spacer 17. The second λ/4 plate 7 may cover a surface of the photo spacer 17 on the back surface side (in FIG. 1, a surface on the second alignment film 10 side) in addition to the side surface thereof.

The first λ/4 plate 5 can be obtained by forming the same material as that of the second λ/4 plate 7 on a surface of a substrate by the same method as that for the second λ/4 plate 7, and be bonded on a surface of the first substrate 6a (first support substrate 13) on the observation surface side through a bonding agent or the like. Alternatively, the first λ/4 plate 5 may be made of a liquid crystalline photopolymerizable material (liquid crystalline photopolymerizable monomer). First, an alignment film for the first λ/4 plate 5 and the liquid crystalline photopolymerizable material are sequentially applied to a surface of a substrate to form a multilayer film. Thereafter, the multilayer film is sequentially baked and irradiated with light (for example, ultraviolet) so that the liquid crystalline photopolymerizable material functions as the first λ/4 plate 5. The structure of the liquid crystalline photopolymerizable material is, for example, a structure that includes a mesogenic group containing two or more benzene rings or cyclohexane rings and further includes a photopolymerizable group made of an acrylate group or a methacrylate group at one or both of ends of the mesogenic group.

The in-plane slow axis of the first λ/4 plate 5 and the transmission axis of the first polarizing plate 4 form an angle of 45°. With this configuration, a circular polarizing plate in which the first polarizing plate 4 and the first λ/4 plate 5 are stacked is disposed on the observation surface side of the liquid crystal display panel 2a. With this configuration, incident light from the observation surface side of the liquid crystal display panel 2a is converted into circularly polarized light when transmitting through the circular polarizing plate and then reaches the first substrate 6a. Accordingly, reflection from the first substrate 6a (layer disposed on the observation surface side of the overcoat layer 16) is reduced due to the effect of reflection reduction by the circular polarizing plate, which leads to increased visibility at a bright place. When the first polarizing plate 4 and the first λ/4 plate 5 are stacked to form the circular polarizing plate, a roll-to-roll scheme is preferably used to increase manufacturing efficiency.

The in-plane slow axis of the first λ/4 plate 5 and the in-plane slow axis of the second λ/4 plate 7 are orthogonal to each other. With this configuration, the first λ/4 plate 5 and the second λ/4 plate 7 can cancel retardations thereof for light incident from the back surface side of the liquid crystal display panel 2a, thereby achieving an optical state in which both plates substantially do not exist. In other words, a configuration optically equivalent to that of a conventional horizontal electric field mode liquid crystal display panel is achieved for light incident on the liquid crystal display panel 2a from the backlight 3. Thus, display can be achieved in the horizontal electric field mode using the circular polarizing plate. The first λ/4 plate 5 and the second λ/4 plate 7 are preferably made of an identical material (specifically, a self-assembling photo alignment material). Accordingly, the first λ/4 plate 5 and the second λ/4 plate 7 can cancel retardations thereof including wavelength dispersion.

The alignment direction of the liquid crystal molecules in the liquid crystal layer 9 and the transmission axis of one of the first polarizing plate 4 and the second polarizing plate 12 are preferably parallel to each other when no voltage is applied between the electrodes (in FIG. 1, between the common electrode 20 and the pixel electrode 18) included in one of the first substrate 6a and the second substrate 11 (with no voltage application). With this configuration, a preferable black display state can be achieved with no voltage application.

The first alignment film 8 may be disposed on a surface of the second λ/4 plate 7 on the back surface side as illustrated in FIG. 1. The first alignment film 8 may cover the side surface of the photo spacer 17. The first alignment film 8 may cover a surface of the photo spacer 17 on the back surface side (in FIG. 1, a surface on the second alignment film 10 side) in addition to the side surface thereof.

The first alignment film 8 is preferably made of an alignment material as described below.

The alignment material of the first alignment film 8 preferably contains a solid content that can be post-baked at a temperature equal to or lower than the temperature of the post-baking at the formation of the second λ/4 plate 7. When the first alignment film 8 is formed through post-baking at a temperature higher than the temperature of the post-baking at the formation of the second λ/4 plate 7, an in-plane retardation developed to the second λ/4 plate 7 potentially largely decreases and does not function as a λ/4 plate. For this reason, the alignment material of the first alignment film 8 and the alignment material (self-assembling photo alignment material) of the second λ/4 plate 7 preferably have the same solids content. Accordingly, the same temperature can be employed at the post-baking to form the second λ/4 plate 7 and the first alignment film 8. Thus, when the second λ/4 plate 7 and the first alignment film 8 are formed, the post-baking can be performed by the same device without changing temperature settings, which leads to an increased manufacture efficiency. In addition, the first alignment film 8 can be formed through the same process as that for the second λ/4 plate 7. Specifically, the first alignment film 8 can be formed by sequentially performing the pre-baking, the light irradiation, and the post-baking after the alignment material of the first alignment film 8 is applied to the surface of the second λ/4 plate 7 on the back surface side. In this case, not only the post-baking temperature but also conditions such as the pre-baking temperature and the light irradiation amount can be the same as those for the process of forming the second λ/4 plate 7. The light irradiation to form the first alignment film 8 does not affect characteristics of the second λ/4 plate 7. This is because the second λ/4 plate 7 is post-baked in advance, and thus the alignment of molecules in the second λ/4 plate 7 is fixed by thermal polymerization.

The alignment material of the first alignment film 8 and the alignment material (self-assembling photo alignment material) of the second λ/4 plate 7 preferably contain solvents different from each other. When the alignment material of the first alignment film 8 contains the same solvent as the alignment material of the second λ/4 plate 7, the second λ/4 plate 7 formed in advance potentially melts through formation of the first alignment film 8. For example, when the alignment material of the second λ/4 plate 7 contains N-methyl-2-pyrrolidone (NMP) as a solvent, the alignment material of the first alignment film 8 preferably contains a solvent other than N-methyl-2-pyrrolidone.

The second alignment film 10 may be disposed on a surface of the second substrate 11 on the observation surface side as illustrated in FIG. 1. The second alignment film 10 may be formed by using the same material and method as those for the first alignment film 8.

According to the present embodiment, the following effects can be achieved.

(1) Since the circular polarizing plate in which the first polarizing plate 4 and the first λ/4 plate 5 are stacked is disposed on the observation surface side of the liquid crystal display panel 2a, increased visibility at a bright place is achieved by the effect of reflection prevention by the circular polarizing plate.

(2) Since the second λ/4 plate 7 is made of the self-assembling photo alignment material, the in-plane retardation does not largely differ between the pixel region and the vicinity of the photo spacer 17, and thus light leakage in the vicinity of the photo spacer 17 can be reduced when the second λ/4 plate 7 is used in combination with the black matrix 14.

Modification of Embodiment

A modification of the embodiment is the same as the embodiment except that the first substrate includes no overcoat layer, and thus any duplicate description thereof will be omitted as appropriate.

Figure 2:
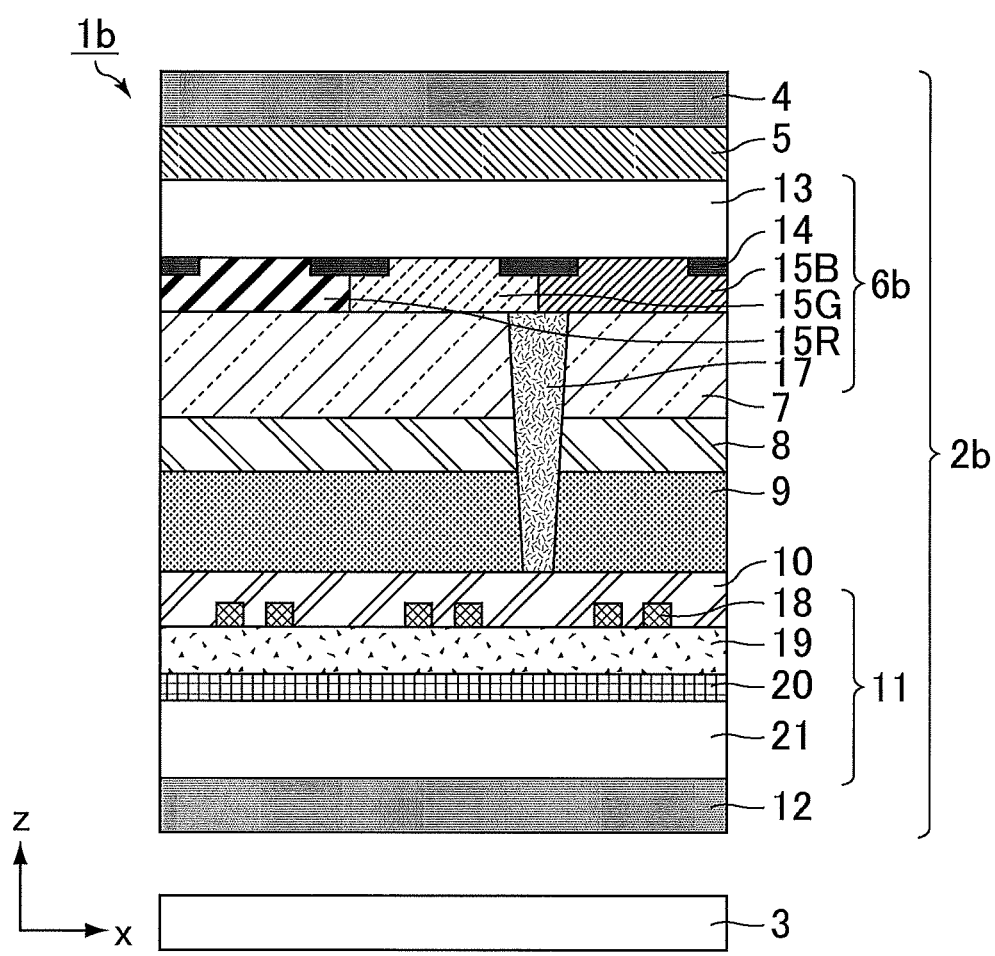
FIG. 2 is a schematic cross-sectional view illustrating a liquid crystal display device according to a modification of the embodiment.

FIG. 2 is a schematic cross-sectional view illustrating a liquid crystal display device according to the modification of the embodiment. As illustrated in FIG. 2, this liquid crystal display device 1b includes a liquid crystal display panel 2b and the backlight 3 sequentially from the observation surface side toward the back surface side.

The liquid crystal display panel 2b includes, sequentially from the observation surface side toward the back surface side, the first polarizing plate 4, the first λ/4 plate 5, a first substrate 6b, the second λ/4 plate 7, the first alignment film 8, the liquid crystal layer 9, the second alignment film 10, the second substrate 11, and the second polarizing plate 12.

The first substrate 6b includes the first support substrate 13, the black matrix 14 disposed on the surface of the first support substrate 13 on the back surface side, the color filter layers 15R (red), 15G (green), and 15B (blue) covering the black matrix 14, and the photo spacer 17 disposed on surfaces of the color filter layers (in FIG. 2, the color filter layers 15G and 15B) on the back surface side. The photo spacer 17 overlaps with the black matrix 14.

Unlike the first substrate 6a described above, the first substrate 6b is not provided with an overcoat layer. Typically, an overcoat layer (for example, a transparent resin film having a thickness of 1 μm approximately) is disposed to equalize the thickness of the liquid crystal layer at a pixel corresponding to each color filter layer by filling and flattening steps (for example, steps of 0.4 μm at maximum) due to differences in the thicknesses of color filter layers (for example, the color filter layers 15R, 15G, and 15B) (for example, by reducing the steps to 0.1 μm at maximum). However, according to the present modification, no overcoat layer is disposed, but the second λ/4 plate 7 (for example, a λ/4 plate having a thickness of 1.50 μm approximately) is disposed on the surfaces of the color filter layers 15R, 15G, and 15B on the back surface side, thereby achieving flatness similarly to that when an overcoat layer is provided.

According to the present modification, since no overcoat layer is disposed in the first substrate 6b, the thickness of the first substrate 6b (in particular, the distance between the black matrix 14 and the second λ/4 plate 7) is smaller than the thickness of the first substrate 6a described above, which leads to reduction of color mixture when the liquid crystal display panel 2b is viewed in an oblique direction. The color mixture is a phenomenon that, for example, light having transmitted through the color filter layer 15R also transmits through the color filter layer 15G (15B) adjacent thereto and appears in a mixed color. The color mixture is normally prevented by hiding behind the black matrix 14, but becomes likely to occur as the distance between the black matrix 14 and the second λ/4 plate 7 increases in FIGS. 1 and 2.

The present invention will be described in more detail below with reference to examples and comparative examples, but is not limited to these examples.

In each example, the in-plane retardation of a λ/4 plate and the retardation of a liquid crystal layer are measured for a wavelength of 550 nm. The azimuth of a transmission axis, the azimuth of an in-plane slow axis, and an alignment direction are defined to be positive (+) in an anticlockwise manner relative to the longitudinal direction (long side; the x direction in the figures) of a liquid crystal display panel (at 0°).

Example 1

A liquid crystal display panel according to the embodiment was produced. Components of a liquid crystal display panel according to Example 1 were as follows.
(First Polarizing Plate 4)

A polarizer (absorptive polarizing plate) obtained by stretching and aligning a polyvinyl alcohol film that an iodine complex (or a dye) dyes and adsorbs on was used. The azimuth of the transmission axis was 900°.
(First λ/4 Plate 5)

A λ/4 plate produced by the following method was used. First, a photolytic type alignment film for the first λ/4 plate 5 and a liquid crystalline photopolymerizable material were sequentially applied to a surface of a polyethylene terephthalate (PET) film to form a multilayer film. Then, the multilayer film was baked at 65° C. for 1 minute and then irradiated with ultraviolet (irradiation amount: 500 mJ). As a result, the first λ/4 plate 5 was obtained. The thickness thereof was 1.50 μm. The in-plane retardation thereof was 137.5 nm. The azimuth of the slow axis thereof was 45°. In the present example, the first λ/4 plate 5 was bonded to the surface of the first substrate 6a (first support substrate 13) on the observation surface side through a bonding agent.
(First Substrate 6a)

A color filter substrate as illustrated in FIG. 1 was used. The first support substrate 13 was a glass substrate having a thickness of 0.7 mm. The black matrix 14 was made of a black resist (light shielding ratio: 99.9%). The color filter layers 15R, 15G, and 15B were made of a pigment dispersion type color resist. The overcoat layer 16 was made of a transparent resin. The photo spacer 17 was made of a resist. The height of the photo spacer 17 was 4.8 μm.
(Second λ/4 Plate 7)

A λ/4 plate produced by the following method was used. First, a self-assembling photo alignment material was applied to the surface of the first substrate 6a on the back surface side (surface on the photo spacer 17 side) to form a photo alignment material film. The self-assembling photo alignment material contained N-methyl-2-pyrrolidone and butyl cellosolve as solvents in addition to a solid content (alignment material F in Table 1). Then, the photo alignment material film was pre-baked at 60° C. for 90 seconds. Subsequently, the pre-baked photo alignment material film was irradiated with polarized ultraviolet (irradiation amount: 100 mJ) having a wavelength of 365 nm. The polarization axis of the polarized ultraviolet was set to be orthogonal to a slow axis to be developed for the second λ/4 plate 7. Lastly, the photo alignment material film subjected to the polarized ultraviolet irradiation was post-baked at 140° C. for 20 minutes. As a result, the second λ/4 plate 7 was obtained. The second λ/4 plate 7 was designed so that the in-plane retardation is 137.5 nm when the thickness thereof is 1.50 μm. The azimuth of the slow axis was −45°.

Figure 3:
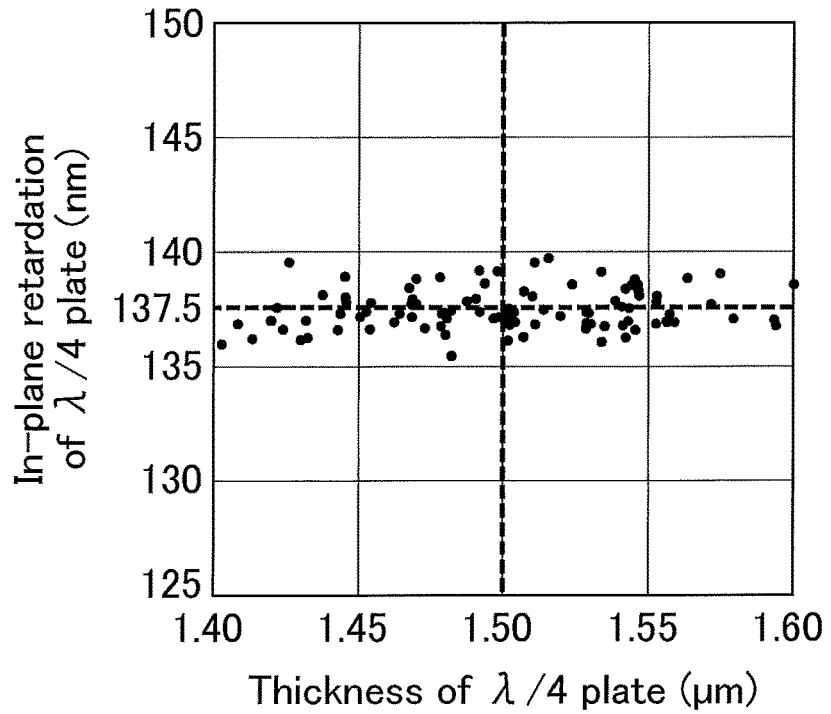
FIG. 3 is a graph illustrating the relation between the in-plane retardation and thickness of a λ/4 plate made of a self-assembling photo alignment material.

The relation between the in-plane retardation and thickness of the second λ/4 plate 7 was studied. Specifically, first, the self-assembling photo alignment material used to form the second λ/4 plate 7 was applied to 100 glass substrates to have thicknesses different from each other in the range of 1.40 to 1.60 μm. Thereafter, similarly to the above-described method, the pre-baking, the light irradiation (polarized ultraviolet irradiation), and the post-baking were sequentially performed to produce 100 samples (λ/4 plates) having thicknesses different from each other. Then, the in-plane retardation of each sample was measured. FIG. 3 illustrates results of the measurement. FIG. 3 is a graph illustrating the relation between the in-plane retardation and thickness of each λ/4 plate made of the self-assembling photo alignment material. As illustrated in FIG. 3, the in-plane retardation of the λ/4 plate was substantially constant near a designed value (137.5 nm) despite of variance of the thickness in the range of a designed value (1.50 μm)±0.10 μm. In other words, the in-plane retardation of the second λ/4 plate 7 made of a self-assembling photo alignment material did not largely vary from the designed value (137.5 nm) despite of variance of the thickness thereof in the range of the designed value (1.50 μm)±0.10 μm.

Figure 4:
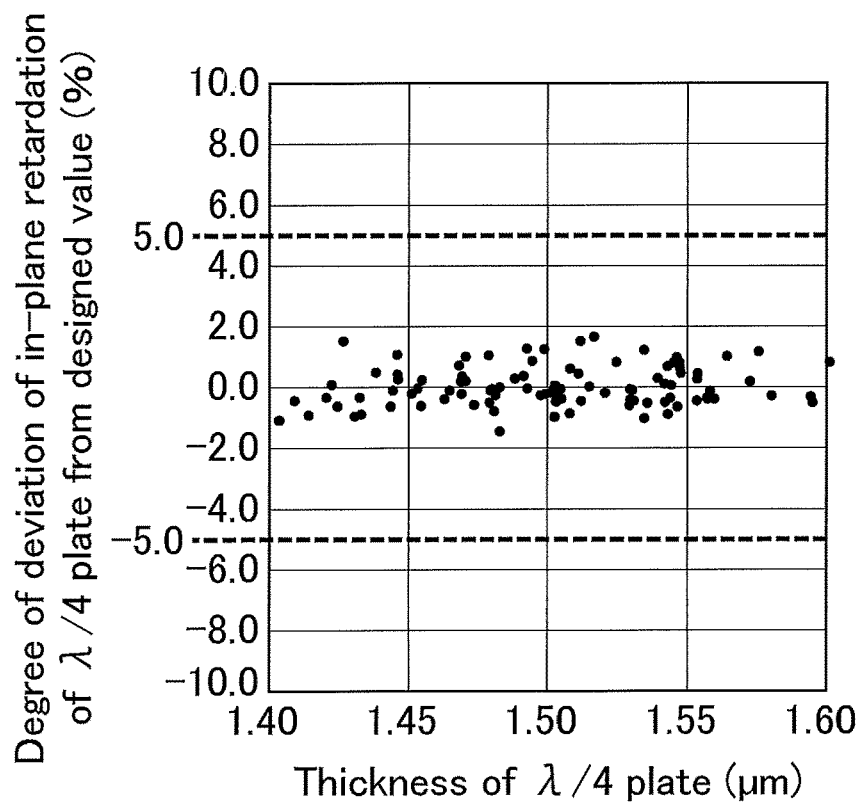
FIG. 4 is a graph derived from FIG. 3 and illustrating the relation between the degree of deviation of the in-plane retardation of the λ/4 plate from a designed value and the thickness thereof.

Subsequently, the degree of deviation of the in-plane retardation of each sample from the designed value (137.5 nm) was calculated from the evaluation result illustrated in FIG. 3. FIG. 4 illustrates results of the calculation. FIG. 4 is a graph derived from FIG. 3 and illustrating the relation between the degree of deviation of the in-plane retardation of the λ/4 plate from the designed value and the thickness thereof. The degree of deviation of the in-plane retardation of the λ/4 plate from the designed value was defined to be 100×(Rt−137.5)/137.5 (unit: %) where Rt (unit: nm) represents the in-plane retardation at a certain thickness. As illustrated in FIG. 4, the degree of deviation of the in-plane retardation of the λ/4 plate from the designed value was within the range of ±2.0% despite of variance of the thickness in the range of the designed value (1.50 μm)±0.10 μm. It is known that a high contrast (equal to or higher than 500) liquid crystal display panel is obtained when the degree of deviation of the in-plane retardation of a λ/4 plate from a designed value is within the range of ±5.0% (within an allowable range) in the pixel region. In other words, the degree of deviation of the in-plane retardation of the second λ/4 plate 7 made of a self-assembling photo alignment material from the designed value was sufficiently in the allowable range of ±5.0% despite of variance of the thickness in the range of the designed value (1.50 μm)±0.10 μm.
(First Alignment Film 8)

An alignment film produced by the following method was used. First, a self-assembling photo alignment material was applied to the surface of the second λ/4 plate 7 on the back surface side to form a photo alignment material film. The self-assembling photo alignment material contained, as a solvent in addition to a solid content (alignment material F in Table 1), a composite prepared by mixing propylene glycol monomethyl ether (PGME) and cyclohexanone (CHN) at a ratio of 6:4. Then, the photo alignment material film was pre-baked at 60° C. for 90 seconds. Subsequently, the pre-baked photo alignment material film was irradiated with polarized ultraviolet (irradiation amount: 100 mJ) having a wavelength of 365 nm. The polarization axis of the polarized ultraviolet was set to be orthogonal to the alignment direction of the liquid crystal molecules in the liquid crystal layer 9 (with no voltage application). Lastly, the photo alignment material film subjected to the polarized ultraviolet irradiation was post-baked at 140° C. for 20 minutes. As a result, the first alignment film 8 was obtained. The thickness was 100 nm.

(Liquid Crystal Layer 9)

A Liquid crystal layer made of a negative type liquid crystal material having negative anisotropy of dielectric constant ($\Delta\varepsilon=-4.0$) was used. The refractive index anisotropy ($\Delta n$) thereof was 0.095. The thickness thereof was 3.3 µm. The retardation thereof was 300 nm. The alignment direction of the liquid crystal molecules in the liquid crystal layer 9 (with no voltage application) was 0°.

(Second Alignment Film 10)

An alignment film produced by the following method was used. First, a self-assembling photo alignment material was applied to the surface of the second substrate 11 on the observation surface side to form a photo alignment material film. The self-assembling photo alignment material contained, as a solvent in addition to a solid content (alignment material F in Table 1), a composite prepared by mixing propylene glycol monomethyl ether (PGME) and cyclohexanone (CHN) at a ratio of 6:4. Then, the photo alignment material film was pre-baked at 60° C. for 90 seconds. Subsequently, the pre-baked photo alignment material film was irradiated with polarized ultraviolet (irradiation amount: 100 mJ) having a wavelength of 365 nm. The polarization axis of the polarized ultraviolet was set to be orthogonal to the alignment direction of the liquid crystal molecules in the liquid crystal layer 9 (with no voltage application). Lastly, the photo alignment material film subjected to the polarized ultraviolet irradiation was post-baked at 140° C. for 20 minutes. As a result, the second alignment film 10 was obtained. The thickness was 100 nm.

(Second Substrate 11)

An FFS mode thin-film transistor array substrate as illustrated in FIG. 1 was used. The second support substrate 21 was a glass substrate having a thickness of 0.7 mm. The common electrode 20 was made of indium zinc oxide (IZO). The insulating film 19 was made of silicon nitride (SiN). The thickness of the insulating film 19 was 300 nm. The pixel electrode 18 was made of indium zinc oxide (IZO).

(Second Polarizing Plate 12)

A polarizer (absorptive polarizing plate) obtained by stretching and aligning a polyvinyl alcohol film that an iodine complex (or a dye) dyes and adsorbs on was used. The azimuth of the transmission axis was 00.

Figure 5:
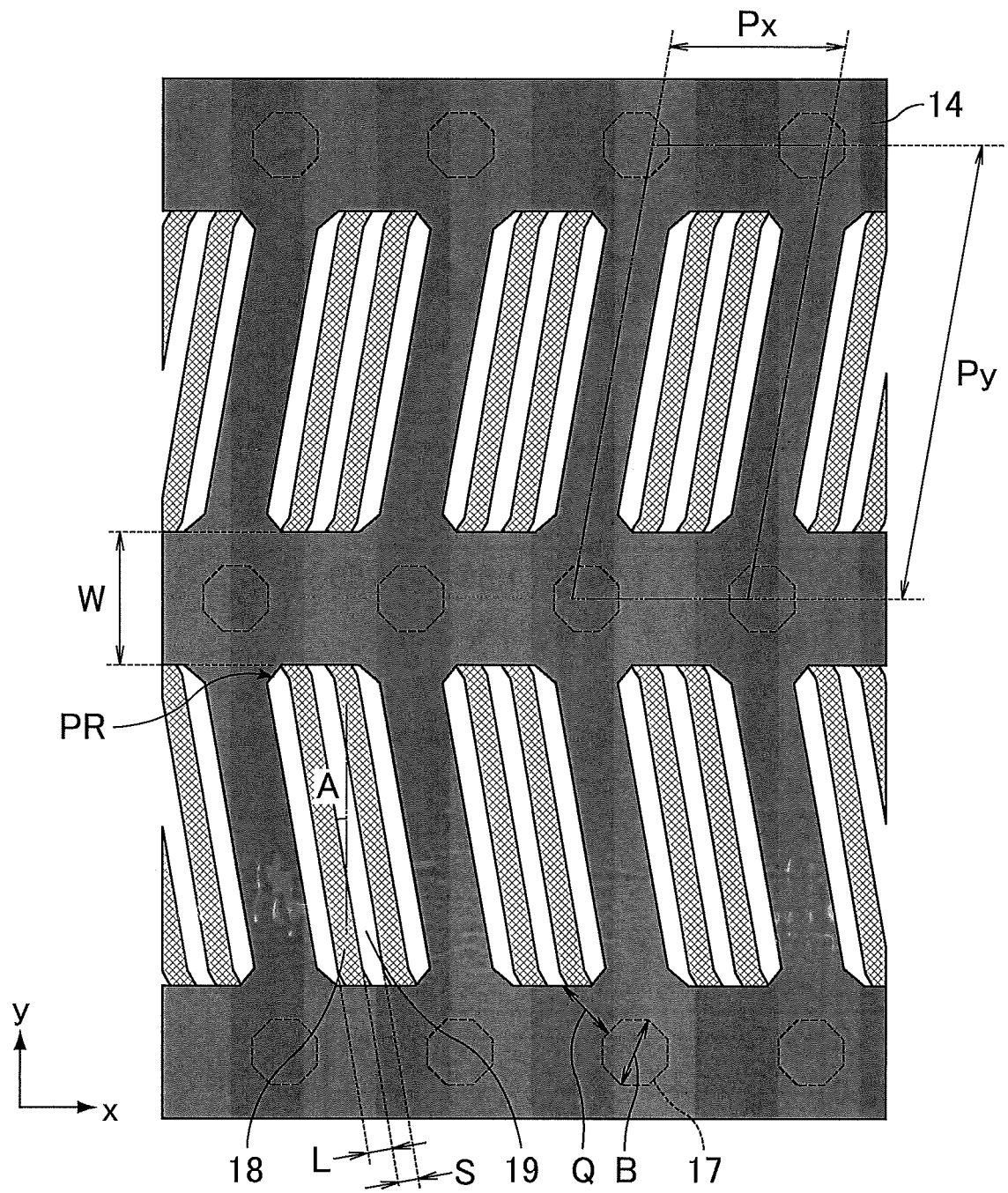
FIG. 5 is a schematic plan view illustrating a pixel structure of a liquid crystal display panel according to Example 1.

The following describes a pixel structure of the liquid crystal display panel according to Example 1 with reference to FIG. 5. FIG. 5 is a schematic plan view illustrating the pixel structure of the liquid crystal display panel according to Example 1. FIG. 5 illustrates a diagram focused on the black matrix 14, the photo spacer 17, and the pixel electrode 18 when the liquid crystal display panel in FIG. 1 is viewed from the observation surface side. As illustrated in FIG. 5, a plurality of regions (openings) partitioned by the black matrix 14 each correspond to a pixel region PR. The pixel electrode 18 (width: L) provided with a slit (width: S) is disposed in the pixel region PR so that image display is performed by controlling voltage (signal voltage) input through a thin-film transistor. In the present example, the width L of the pixel electrode 18 was 2.5 µm. The width S of the slit (the interval of the pixel electrode 18) was 3.0 µm.

The direction of rotation of the liquid crystal molecules in the liquid crystal layer 9 is defined to be one direction by the pixel electrode 18 upon voltage application. Specifically, the long axis of each liquid crystal molecule is tilted by A (the tilt angle of the pixel electrode 18) relative to the y direction in FIG. 5 upon voltage application. In the present example, the tilt angle A of the pixel electrode 18 was 10°. Each liquid crystal molecule in the liquid crystal layer 9 was aligned so that the long axis was along the x direction (0°) in FIG. 5 with no voltage application. The plane shape of the pixel electrode 18 in the pixel region PR arranged on an odd-numbered row and the plane shape of the pixel electrode 18 in the pixel region PR arranged on an even-numbered row adjacent to the odd-numbered row were line-symmetric with respect to the x direction in FIG. 5 to improve the viewing angle characteristic.

The photo spacer 17 (diameter: B) was disposed at pitches Px and Py to be hidden by the black matrix 14 (width: W) and was disposed so that the shortest distance to the pixel region PR (shortest distance between an end part of the photo spacer 17 and an end part of the pixel region PR) was Q. In the present example, the width W of the black matrix 14 was 20 µm. The diameter B of the photo spacer 17 (diameter of a surface thereof on the observation surface side) was 10 m. The pitches Px and Py of the photo spacer 17 were 20 µm and 60 µm, respectively. The shortest distance Q between the photo spacer 17 and the pixel region PR was 6.3 µm.

Example 2

A liquid crystal display panel was produced in the same manner as in Example 1 except that the height of the photo spacer 17 was changed to 4.5 µm and the refractive index anisotropy ($\Delta n$) and thickness of the liquid crystal layer 9 were changed to 0.100 and 3.0 µm, respectively.

Example 3

A liquid crystal display panel according to the modification of the embodiment was produced. Components of a liquid crystal display panel according to Example 3 were the same as those of Example 1 (except for the overcoat layer 16).

Comparative Example 1

Figure 6:
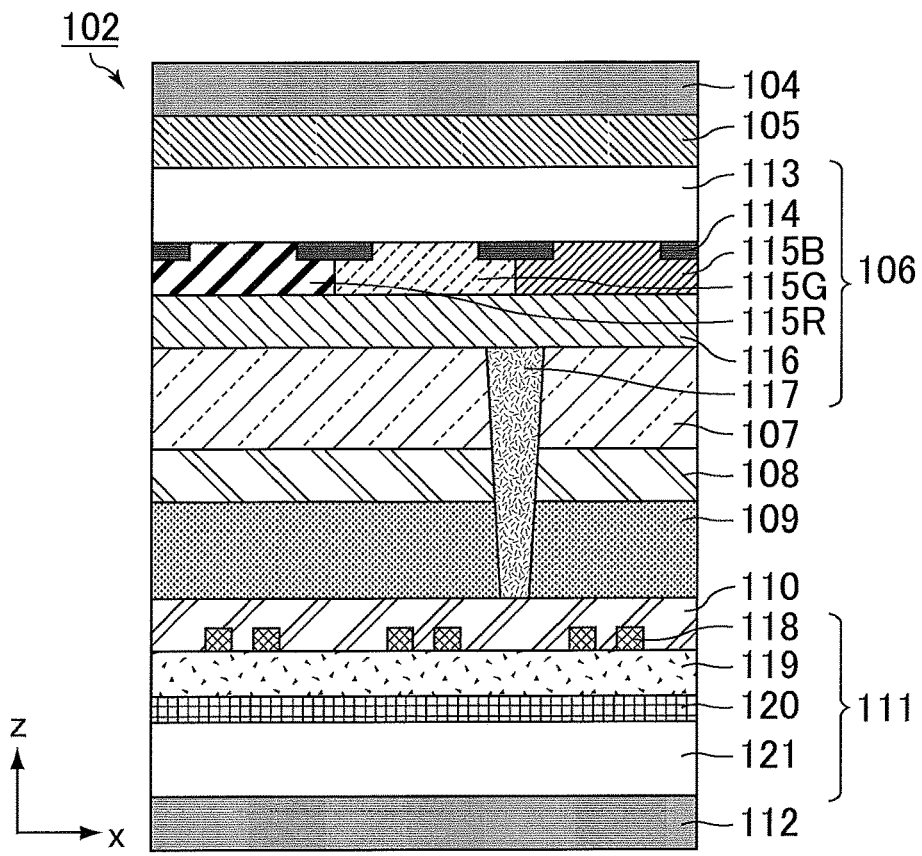
FIG. 6 is a schematic cross-sectional view illustrating a liquid crystal display panel according to Comparative Example 1.

FIG. 6 is a schematic cross-sectional view illustrating a liquid crystal display panel according to Comparative Example 1. As illustrated in FIG. 6, a liquid crystal display panel 102 includes, sequentially from an observation surface side toward a back surface side, a first polarizing plate 104, a first λ/4 plate 105, a first substrate 106, a second λ/4 plate 107, a first alignment film 108, a liquid crystal layer 109, a second alignment film 110, a second substrate 111, and a second polarizing plate 112.

The first substrate 106 includes a first support substrate 113, a black matrix 114 disposed on a surface of the first support substrate 113 on the back surface side, color filter layers 115R (red), 115G (green), and 115B (blue) covering the black matrix 114, an overcoat layer 116 covering the color filter layers 115R, 115G, 115B, and a photo spacer 117 disposed on a surface of the overcoat layer 116 on the back surface side. The photo spacer 117 overlaps with the black matrix 114.

The second substrate 111 includes a second support substrate 121, a common electrode 120 disposed on a surface of the second support substrate 121 on the observation surface side, an insulating film 119 covering the common electrode 120, and a pixel electrode (signal electrode) 118 disposed on a surface of the insulating film 119 on the observation surface side.

Components of the liquid crystal display panel according to Comparative Example 1 were as follows.
(First Polarizing Plate 104)

A polarizer (absorptive polarizing plate) obtained by stretching and aligning a polyvinyl alcohol film that an iodine complex (or a dye) dyes and adsorbs on was used. The azimuth of the transmission axis was 900.
(First λ/4 Plate 105)

A λ/4 plate produced by the following method was used. First, a photolytic type alignment film for the first λ/4 plate 105, and a liquid crystalline photopolymerizable material were sequentially applied to a surface of a polyethylene terephthalate (PET) film to form a multilayer film. Then, the multilayer film was baked at 65° C. for 1 minute and then irradiated with ultraviolet (irradiation amount: 500 mJ). As a result, the first λ/4 plate 105 was obtained. The thickness thereof was 1.50 μm. The in-plane retardation thereof was 137.5 nm. The azimuth of the slow axis thereof was 45°. In the present comparative example, the first λ/4 plate 105 was bonded to a surface of the first substrate 106 (first support substrate 113) on the observation surface side through a bonding agent.
(First Substrate 106)

A color filter substrate as illustrated in FIG. 6 was used. The first support substrate 113 was a glass substrate having a thickness of 0.7 mm. The black matrix 114 was made of a black resist (light shielding ratio: 99.9%). The color filter layers 115R, 115G, 115B were made of a pigment dispersion type color resist. The overcoat layer 116 was made of a transparent resin. The photo spacer 117 was made of a resist. The height of the photo spacer 117 was 4.8 m.
(Second λ/4 Plate 107)

A λ/4 plate produced by the following method was used. First, a photolytic type alignment film for the second λ/4 plate 107, and a liquid crystalline photopolymerizable material were sequentially applied to a surface of the first substrate 106 on the back surface side (surface thereof on the photo spacer 117 side) to form a multilayer film. Then, the multilayer film was baked at 65° C. for 1 minute and then irradiated with ultraviolet (irradiation amount: 500 mJ). As a result, the second λ/4 plate 107 was obtained. The second λ/4 plate 107 was designed so that the in-plane retardation is 137.5 nm when the thickness thereof is 1.50 μm. The azimuth of the slow axis was −45°.

Figure 7:
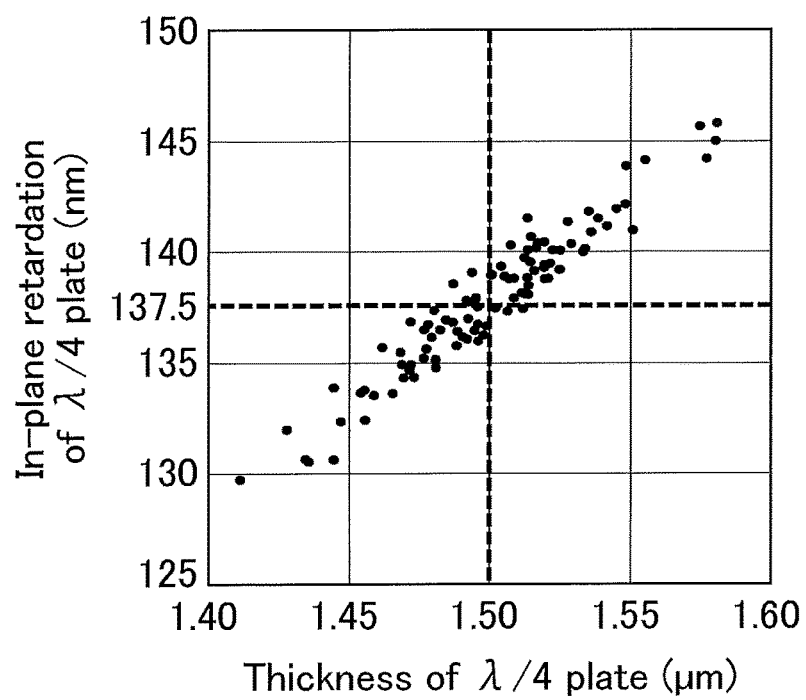
FIG. 7 is a graph illustrating the relation between the in-plane retardation and thickness of a λ/4 plate made of a liquid crystalline photopolymerizable material.

The relation between the in-plane retardation and thickness of the second λ/4 plate 107 was studied. Specifically, first, the liquid crystalline photopolymerizable material used to form the second λ/4 plate 107 was applied to 100 glass substrates to have thicknesses different from each other in the range of 1.40 to 1.60 μm. Thereafter, similarly to the above-described method, the baking and the light irradiation (ultraviolet irradiate) were sequentially performed to produce 100 samples (λ/4 plates) having thicknesses different from each other. Then, the in-plane retardation of each sample was measured. FIG. 7 illustrates results of the measurement. FIG. 7 is a graph illustrating the relation between the in-plane retardation and thickness of a λ/4 plate made of the liquid crystalline photopolymerizable material. As illustrated in FIG. 7, the in-plane retardation of the λ/4 plate was substantially proportional to the thickness. This is because, unlike a self-assembling photo alignment material, the liquid crystalline photopolymerizable material does not have refractive index anisotropy determined mainly in accordance with the baking and light irradiation processes but is a liquid crystal material having unique refractive index anisotropy. In other words, the in-plane retardation of the second λ/4 plate 107 made of the liquid crystalline photopolymerizable material varied from the designed value (137.5 nm) in proportional to the thickness along with variance of the thickness from the designed value (1.50 μm).

Figure 8:
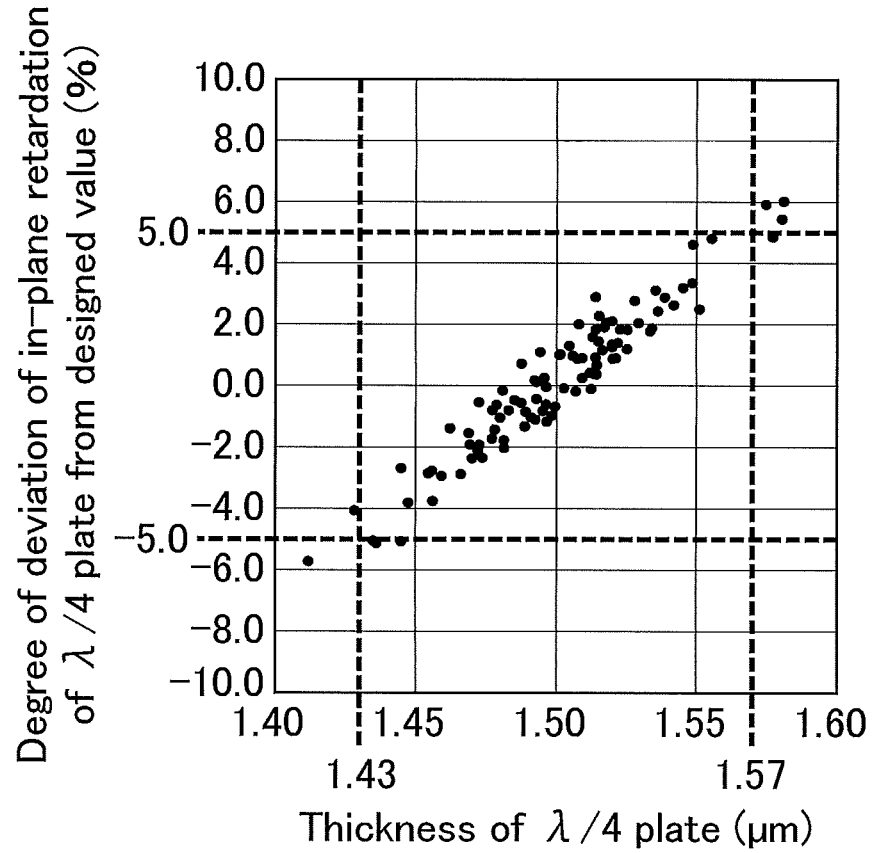
FIG. 8 is a graph derived from FIG. 7 and illustrating the relation between the degree of deviation of the in-plane retardation of the λ/4 plate from the designed value and the thickness thereof.

Subsequently, the degree of deviation of the in-plane retardation of each sample from the designed value (137.5 nm) was calculated from the evaluation result illustrated in FIG. 7 in the same manner as the method described above with reference to FIG. 4. FIG. 8 illustrates results of the calculation. FIG. 8 is a graph derived from FIG. 7 and illustrating the relation between the degree of deviation of the in-plane retardation of the λ/4 plate from the designed value and the thickness thereof. As illustrated in FIG. 8, the degree of deviation of the in-plane retardation of the λ/4 plate from the designed value was out of the allowable range of ±5.0% in some cases when the thickness varied in the range of the designed value (1.50 μm)±0.10 μm. Specifically, the degree of deviation of the in-plane retardation of the λ/4 plate from the designed value was out of the range of ±5.0% when the thickness was out of the range of the designed value (1.50 μm)±0.07 μm. In other words, the thickness of the second λ/4 plate 107 made of the liquid crystalline photopolymerizable material needed to be in the range of the designed value (1.50 μm)±0.07 μm so that the degree of deviation of the in-plane retardation from the designed value was in the range of ±5.0%.
(First Alignment Film 108)

An alignment film produced by the following method was used. First, a polyimide alignment material was applied to a surface of the second λ/4 plate 107 on the back surface side to form an alignment material film. Then, the alignment material film was pre-baked at 90° C. for 2 minutes and then post-baked at 220° C. for 40 minutes. As a result, the first alignment film 108 was obtained. The thickness was 100 nm. The first alignment film 108 was subjected to rubbing treatment to define the alignment direction of liquid crystal molecules in the liquid crystal layer 109.
(Liquid Crystal Layer 109)

A Liquid crystal layer made of a negative type liquid crystal material having negative anisotropy of dielectric constant (Δε=−4.0) was used. The refractive index anisotropy (Δn) thereof was 0.095. The thickness thereof was 3.3 μm. The retardation thereof was 300 nm. The alignment direction of the liquid crystal molecules in the liquid crystal layer 109 (with no voltage application) was 0°.
(Second Alignment Film 110)

An alignment film produced by the following method was used. First, a polyimide alignment material was applied to a surface of the second substrate 111 on the observation surface side to form an alignment material film. Then, the alignment material film was pre-baked at 90° C. for 2 minutes and then post-baked at 220° C. for 40 minutes. As a result, the second alignment film 110 was obtained. The thickness was 100 nm. The second alignment film 110 was subjected to rubbing treatment to define the alignment direction of the liquid crystal molecules in the liquid crystal layer 109.

(Second Substrate 111)

An FFS mode thin-film transistor array substrate as illustrated in FIG. 6 was used. The second support substrate 121 was a glass substrate having a thickness of 0.7 mm. The common electrode 120 was made of indium zinc oxide (IZO). The insulating film 119 was made of silicon nitride (SiN). The thickness of the insulating film 119 was 300 nm. The pixel electrode 118 was made of indium zinc oxide (IZO).

(Second Polarizing Plate 112)

A polarizer (absorptive polarizing plate) obtained by stretching and aligning a polyvinyl alcohol film that an iodine complex (or a dye) dyes and adsorbs on was used. The azimuth of the transmission axis was 0°.

Figure 9:
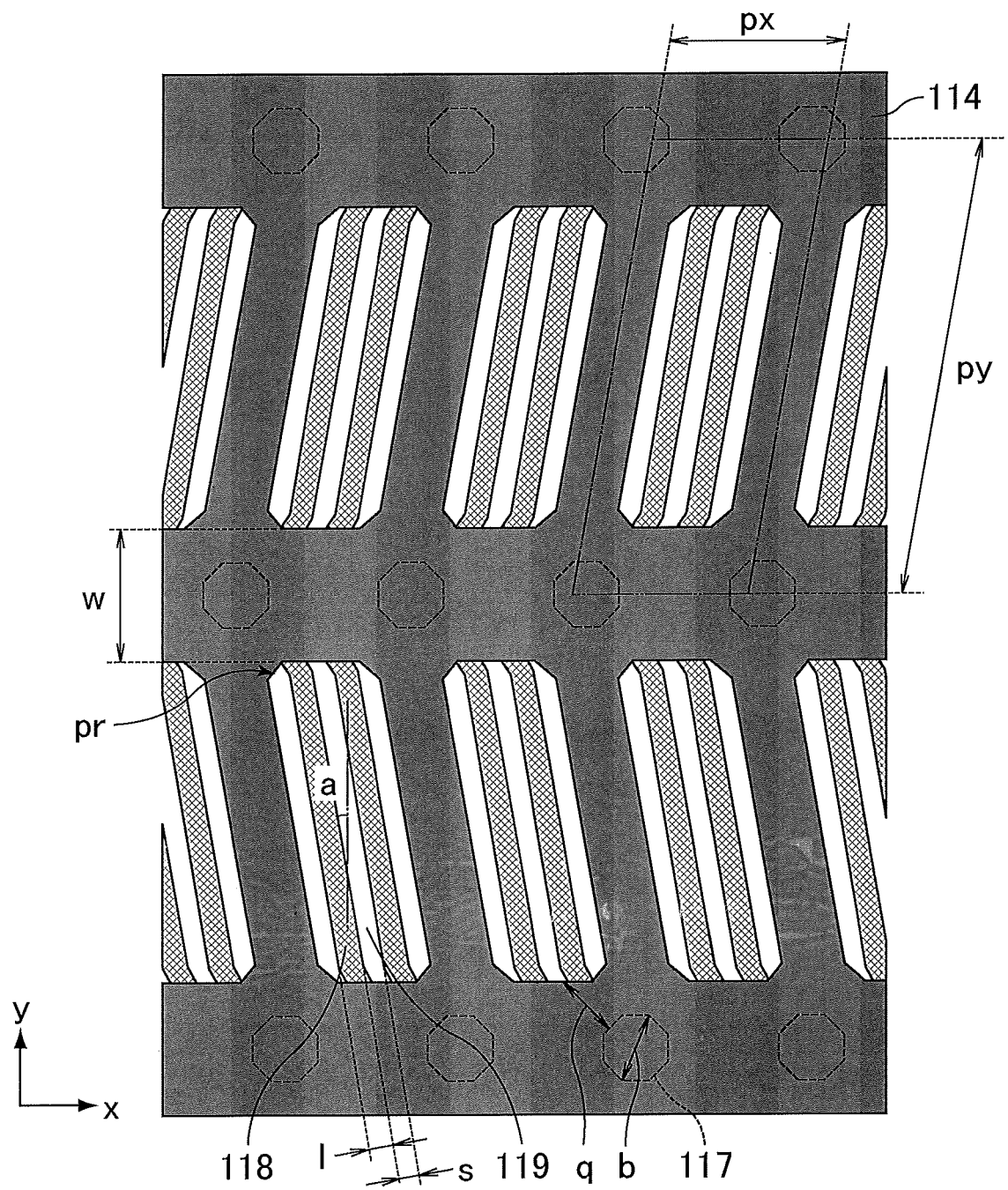
FIG. 9 is a schematic plan view illustrating a pixel structure of the liquid crystal display panel according to Comparative Example 1.

The following describes a pixel structure of the liquid crystal display panel according to Comparative Example 1 with reference to FIG. 9. FIG. 9 is a schematic plan view illustrating the pixel structure of the liquid crystal display panel according to Comparative Example 1. FIG. 9 illustrates a diagram focused on the black matrix 114, the photo spacer 117, and the pixel electrode 118 when the liquid crystal display panel in FIG. 6 is viewed from the observation surface side. As illustrated in FIG. 9, a plurality of regions (openings) partitioned by the black matrix 114 each correspond to a pixel region pr. The pixel electrode 18 (width: I) provided with a slit (width: s) is disposed in the pixel region pr. In the present comparative example, the width 1 of the pixel electrode 118 was 2.5 µm. The width s of the slit (interval of the pixel electrode 118) was 3.0 µm.

The long axis of each liquid crystal molecule in the liquid crystal layer 109 is tilted by a (the tilt angle of the pixel electrode 118) relative to the y direction in FIG. 9 upon voltage application. In the present comparative example, the tilt angle a of the pixel electrode 118 was 10°. Each liquid crystal molecule in the liquid crystal layer 109 was aligned so that the long axis was along the x direction in FIG. 9 (00) with no voltage application.

The photo spacer 117 (diameter: b) was disposed at pitches px and py to be hidden by the black matrix 114 (width: w) and was disposed so that the shortest distance to the pixel region pr (shortest distance between an end part of the photo spacer 117 and an end part of the pixel region pr) was q. In the present comparative example, the width w of the black matrix 114 was 20 µm. The diameter b of the photo spacer 117 (diameter on a surface thereof on the observation surface side) was 10 µm. The pitches px and py of the photo spacer 117 were 20 µm and 60 µm, respectively. The shortest distance q between the photo spacer 117 and the pixel region pr was 6.3 µm.

[Evaluation 1]

Figure 10:
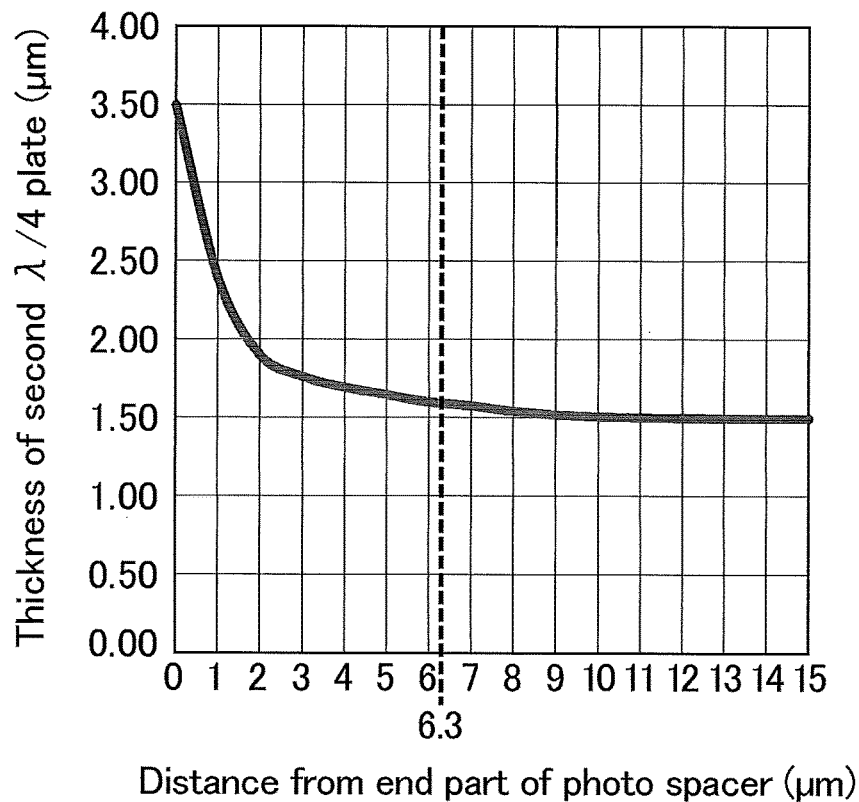
FIG. 10 is a graph illustrating the relation between the thickness of a second λ/4 plate and the distance from an end part of a photo spacer in Example 1.
Figure 11:
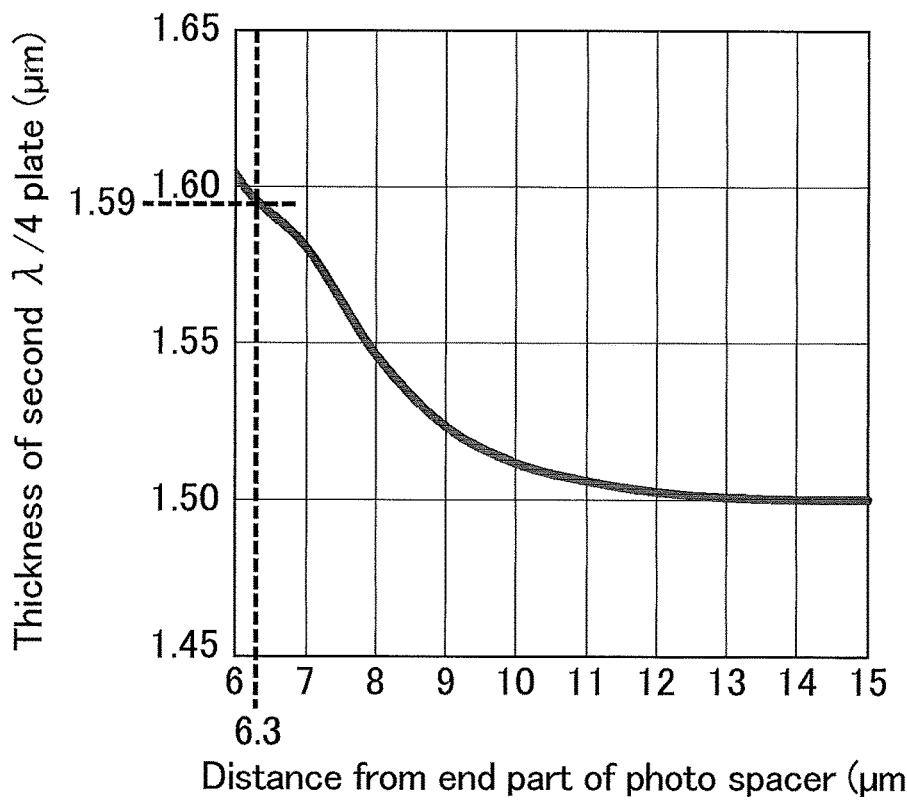
FIG. 11 is an enlarged graph of a region in which the horizontal axis is 6 to 15 μm in FIG. 10.

The relation between the distance from the end part of the photo spacer 17 and the thickness of the second λ/4 plate 7 at the distance was studied for Example 1. FIG. 10 is a graph illustrating the relation between the thickness of the second λ/4 plate and the distance from the end part of the photo spacer in Example 1. FIG. 11 is an enlarged graph of a region in which the horizontal axis is 6 to 15 pun in FIG. 10. As illustrated in FIG. 10, the thickness of the second λ/4 plate 7 becomes larger than the designed value (1.50 µm) at a position closer to the photo spacer 17 and equal to 3.50 µm at the end part of the photo spacer 17 (the horizontal axis: 0 µm), which is twice or more as large as the designed value (1.50 µm) in the pixel region PR. In Example 1, since the shortest distance Q between the photo spacer 17 and the pixel region PR was 6.3 µm as illustrated in FIG. 5, a region in which the thickness of the second λ/4 plate 7 is larger than the designed value (1.50 µm) was almost entirely covered by the black matrix 14. As illustrated in FIG. 11, the thickness of the second λ/4 plate 7 was 1.59 µm at a position separated by 6.3 µm from the end part of the photo spacer 17, in other words, at the end part of the pixel region PR, which is larger than the designed value (1.50 µm) by 0.09 µm.

Figure 12:
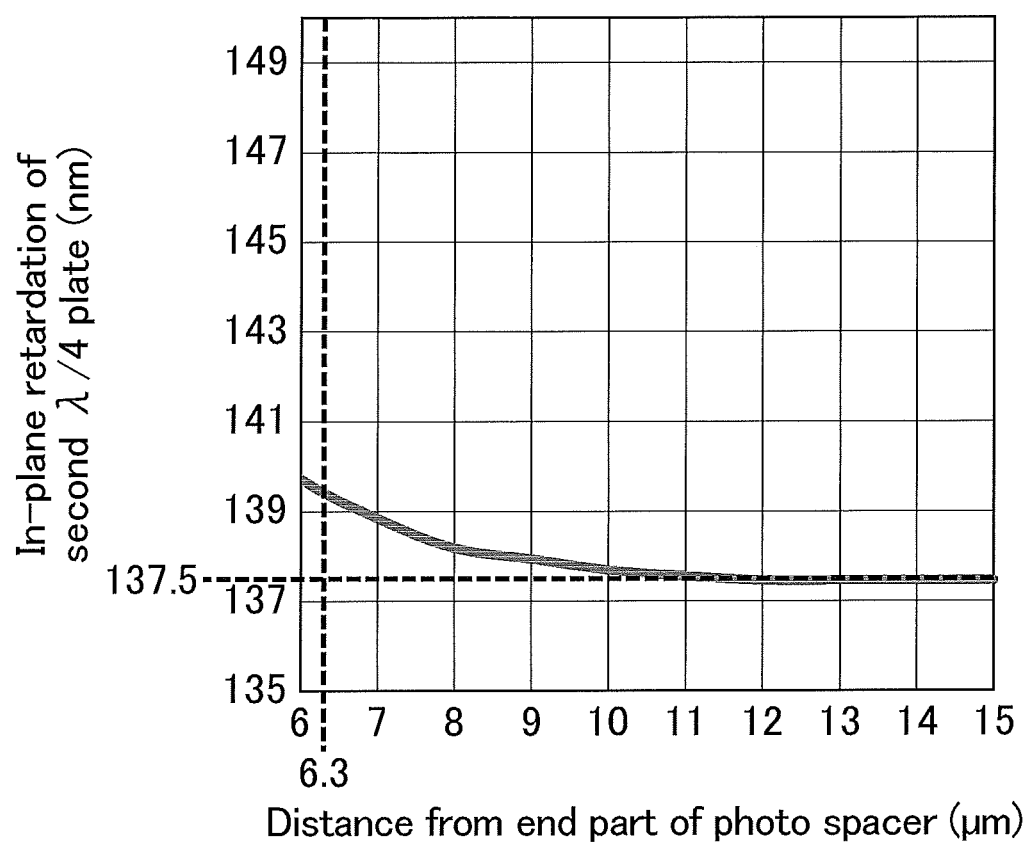
FIG. 12 is a graph illustrating the relation between the in-plane retardation of the second λ/4 plate and the distance from the end part of the photo spacer in Example 1.

Subsequently, the relation between the distance from the end part of the photo spacer 17 and the in-plane retardation of the second λ/4 plate 7 at the distance was studied for Example 1. FIG. 12 is a graph illustrating the relation between the in-plane retardation of the second λ/4 plate and the distance from the end part of the photo spacer in Example 1. As illustrated in FIG. 12, the in-plane retardation of the second λ/4 plate 7 slowly increases in a region (including the pixel region PR) in which the distance from the end part of the photo spacer 17 is 6.3 µm or larger. This is because the in-plane retardation of the second λ/4 plate 7 is substantially constant irrespective of the thickness as described above with reference to FIG. 3.

Figure 13:
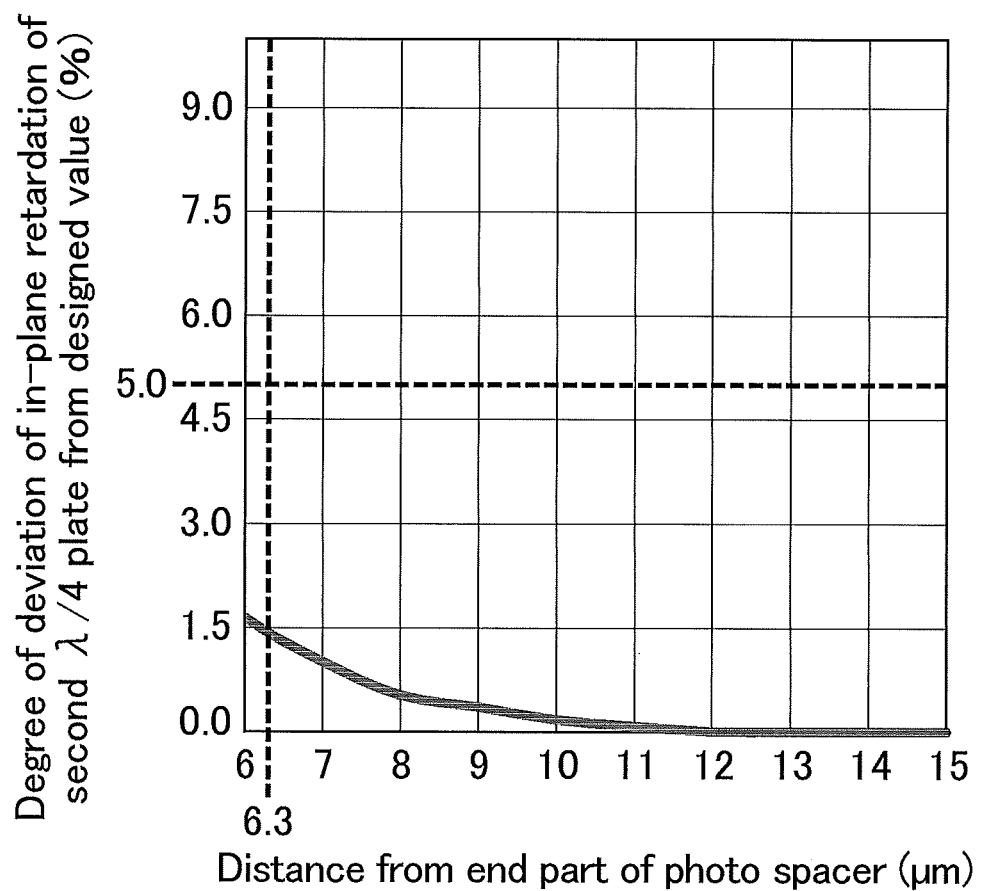
FIG. 13 is a graph derived from FIG. 12 and illustrating the relation between the degree of deviation of the in-plane retardation of the second λ/4 plate from a designed value and the distance from the end part of the photo spacer.

The degree of deviation of the in-plane retardation of the second λ/4 plate 7 from the designed value (137.5 nm) was calculated from the evaluation result illustrated in FIG. 12. FIG. 13 illustrates results of the calculation. FIG. 13 is a graph derived from FIG. 12 and illustrating the relation between the degree of deviation of the in-plane retardation of the second λ/4 plate from the designed value and the distance from the end part of the photo spacer. As illustrated in FIG. 13, the degree of deviation of the in-plane retardation of the second λ/4 plate 7 from the designed value was sufficiently in the allowable range of ±5.0% (in FIG. 13, in the range of 0 to 5.0%) in the region (including the pixel region PR) in which the distance from the end part of the photo spacer 17 is 6.3 µm or larger.

As described above, the in-plane retardation of the second λ/4 plate 7 does not largely differ between the pixel region PR and the vicinity of the photo spacer 17 even when the thickness increases as the position approaches the photo spacer 17 from the pixel region PR, and light leakage in the vicinity of the photo spacer 17 can be reduced when the second λ/4 plate 7 is used in combination with the black matrix 14. No light leakage was found in observation of the liquid crystal display panel according to Example 1 (with no voltage application) with a polarization microscope. Accordingly, the use of the second λ/4 plate 7 leads to reduction of luminance in the black display state not only in the vicinity of the photo spacer 17 but also in the pixel region PR, thereby achieving a high contrast liquid crystal display panel. The contrast of the liquid crystal display panel according to Example 1 was measured to be 700 in a darkroom (environment in which the illuminance is 0.1 lx or lower).

[Evaluation 2]

Figure 14:
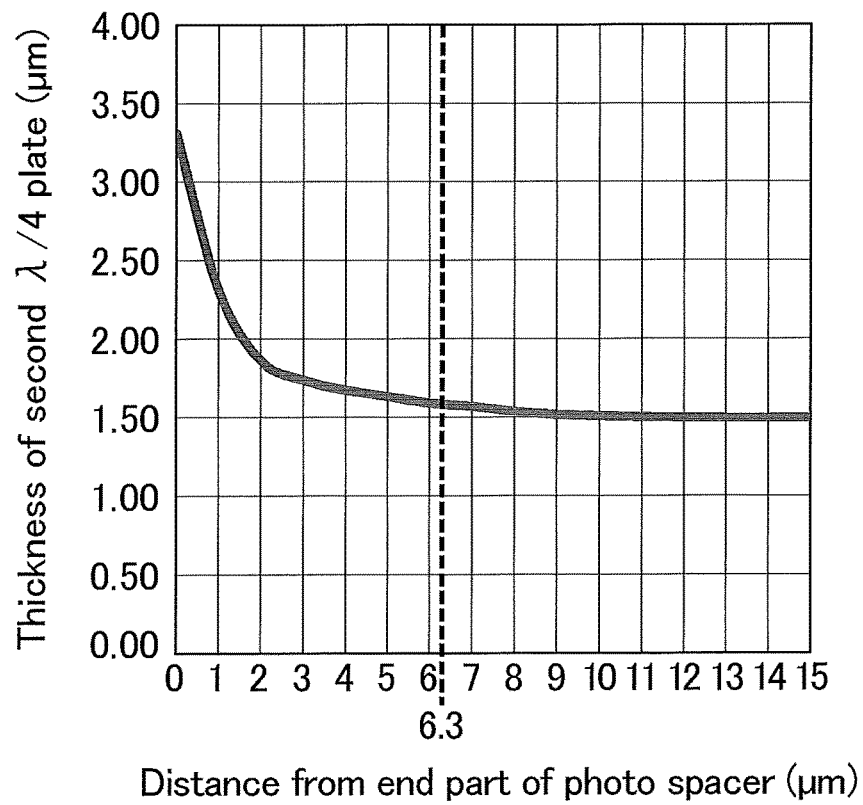
FIG. 14 is a graph illustrating the relation between the thickness of the second λ/4 plate and the distance from the end part of the photo spacer in Example 2.
Figure 15:
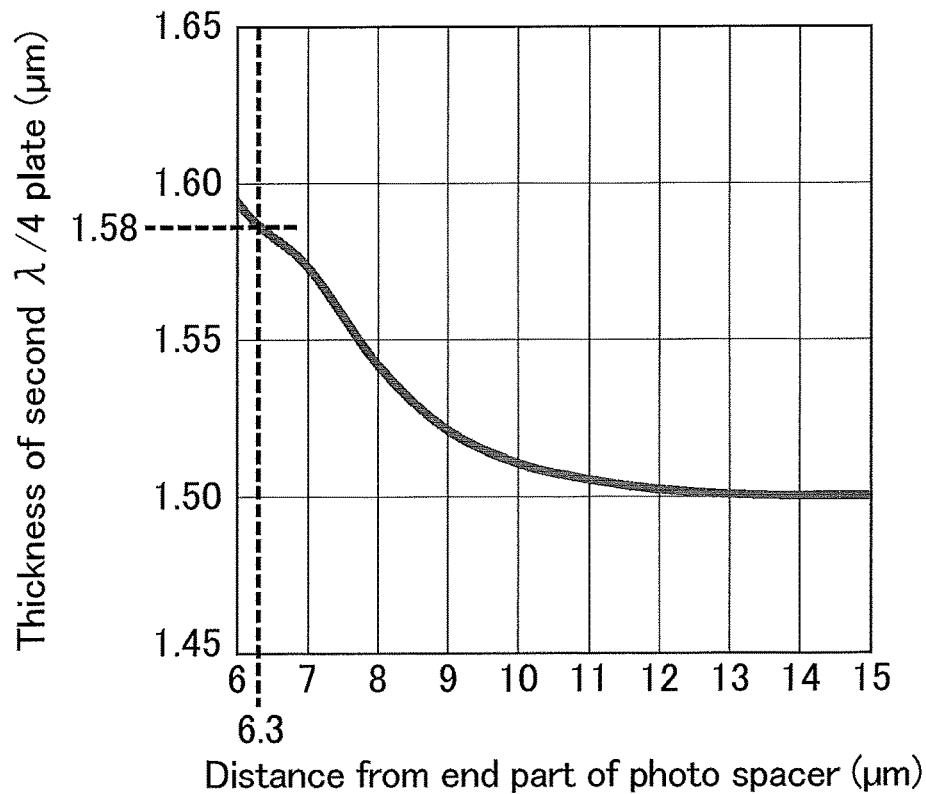
FIG. 15 is an enlarged graph of a region in which the horizontal axis is 6 to 15 μm in FIG. 14.

The relation between the distance from the end part of the photo spacer 17 and the thickness of the second λ/4 plate 7 at the distance was studied for Example 2. FIG. 14 is a graph illustrating the relation between the thickness of the second λ/4 plate and the distance from the end part of the photo spacer in Example 2. FIG. 15 is an enlarged graph of a region in which the horizontal axis is 6 to 15 µm in FIG. 14. As illustrated in FIG. 14, the thickness of the second λ/4 plate 7 becomes larger than the designed value (1.50 µm) at a position closer to the photo spacer 17 and more than twice as large as the designed value (1.50 µm) in the pixel region PR at the end part of the photo spacer 17 (the horizontal axis: 0 µm). In Example 2, similarly to Example 1, the shortest distance Q between the photo spacer 17 and the pixel region PR was 6.3 µm, and thus a region in which the thickness of the second λ/4 plate 7 is larger than the designed value (1.50

μm) was almost entirely covered by the black matrix 14. As illustrated in FIG. 15, the thickness of the second λ/4 plate 7 was 1.58 μm at a position separated by 6.3 μm from the end part of the photo spacer 17, in other words, at the end part of the pixel region PR, which is larger than the designed value (1.50 μm) by 0.08 μm. Accordingly, in Example 2, the thickness of the second λ/4 plate 7 in the vicinity of the photo spacer 17 was smaller than that in Example 1.

Subsequently, the relation between the distance from the end part of the photo spacer 17 and the in-plane retardation of the second λ/4 plate 7 at the distance was studied for Example 2 and found to have a tendency similar to that of Example 1. The degree of deviation of the in-plane retardation of the second λ/4 plate 7 from the designed value (137.5 nm) was calculated from this evaluation result and found to have a tendency similar to that of Example 1: the degree of deviation of the in-plane retardation of the second λ/4 plate 7 from the designed value was sufficiently in the allowable range of ±5.0% in the region (including the pixel region PR) in which the distance from the end part of the photo spacer 17 is 6.3 μm or larger.

As described above, the in-plane retardation of the second λ/4 plate 7 does not largely differ between the pixel region PR and the vicinity of the photo spacer 17 even when the thickness increases as the position approaches the photo spacer 17 from the pixel region PR, and light leakage in the vicinity of the photo spacer 17 can be reduced when the second λ/4 plate 7 is used in combination with the black matrix 14. No light leakage was found in observation of the liquid crystal display panel according to Example 2 (with no voltage application) with a polarization microscope. Accordingly, the use of the second λ/4 plate 7 leads to reduction of luminance in the black display state not only in the vicinity of the photo spacer 17 but also in the pixel region PR, thereby achieving a high contrast liquid crystal display panel. In addition, in Example 2, since the thickness of the liquid crystal layer 9 was smaller than that in Example 1, light scattering in the liquid crystal layer was reduced in the black display state (with no voltage application), and the liquid crystal display panel had a contrast higher than that of Example 1. The contrast of the liquid crystal display panel according to Example 2 was measured to be 800 in a darkroom (environment in which the illuminance is 0.1 lx or lower), which was higher than that of Example 1.

[Evaluation 3]

The relation between the distance from the end part of the photo spacer 17 and the thickness of the second λ/4 plate 7 at the distance, the relation between the distance from the end part of the photo spacer 17 and the in-plane retardation of the second λ/4 plate 7 at the distance, and the relation between the distance from the end part of the photo spacer 17 and the degree of deviation of the in-plane retardation of the second λ/4 plate 7 from the designed value (137.5 nm) were studied for Example 3 and found to have a tendency similar to that of Example 1.

As described above, the in-plane retardation of the second λ/4 plate 7 does not largely differ between the pixel region PR and the vicinity of the photo spacer 17 even when the thickness increases as the position approaches the photo spacer 17 from the pixel region PR, and light leakage in the vicinity of the photo spacer 17 can be reduced when the second λ/4 plate 7 is used in combination with the black matrix 14. No light leakage was found in observation of the liquid crystal display panel according to Example 3 (with no voltage application) with a polarization microscope. Accordingly, the use of the second λ/4 plate 7 leads to reduction of luminance in the black display state not only in the vicinity of the photo spacer 17 but also in the pixel region PR, thereby achieving a high contrast liquid crystal display panel. In addition, in Example 3, the second λ/4 plate 7 achieves reduction of each step between pixels corresponding to the color filter layers (color filter layers 15R, 15G, and 15B) to the same degree (0.1 μm at maximum) as that in Example 1. The contrast of the liquid crystal display panel according to Example 3 was measured to be 700 in a darkroom (environment in which the illuminance is 0.1 lx or lower), which was equivalent to Example 1.

[Evaluation 4]

The relation between the distance from the end part of the photo spacer 117 and the thickness of the second λ/4 plate 107 at the distance was studied for Comparative Example 1 and found to be similar to the relation illustrated in FIGS. 10 and 11. The thickness of the second λ/4 plate 107 was 1.59 μm at a position separated by 6.3 μm from the end part of the photo spacer 117, in other words, at the end part of the pixel region pr. Consideration with FIG. 8 found that the end part of the pixel region pr is a position at which the degree of deviation of the in-plane retardation of the second λ/4 plate 107 from the designed value becomes larger than 5.0%.

Figure 16:
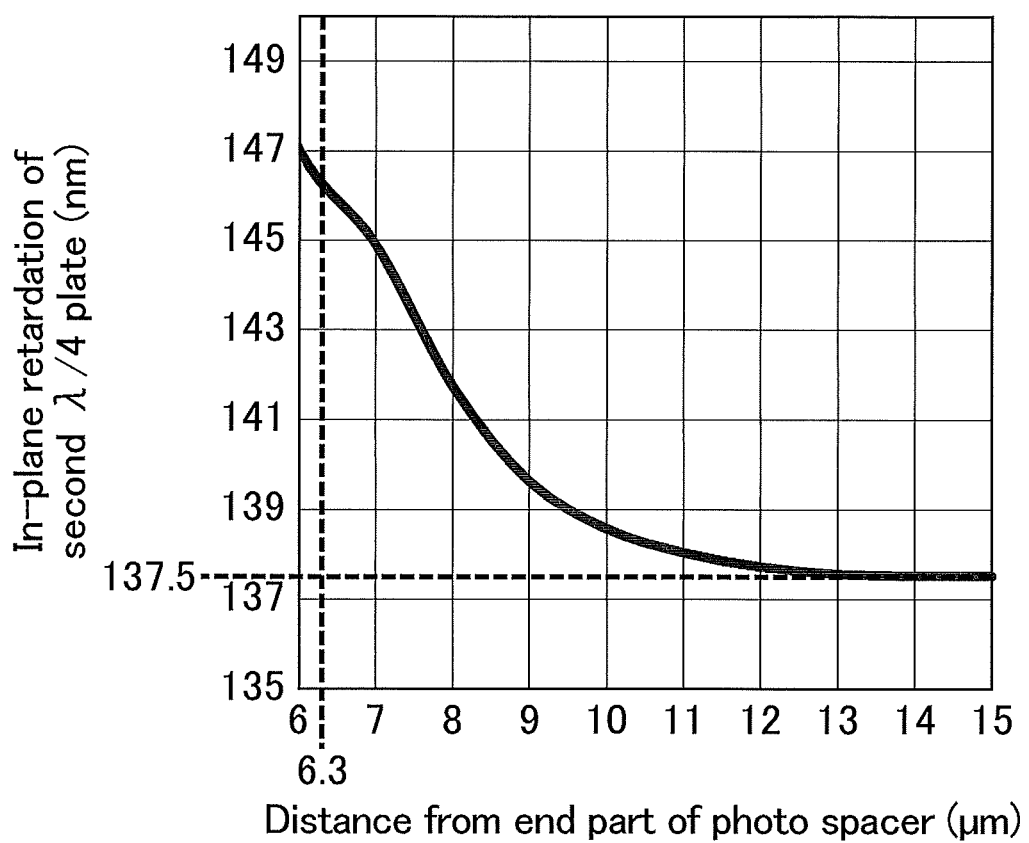
FIG. 16 is a graph illustrating the relation between the in-plane retardation of the second λ/4 plate and the distance from the end part of the photo spacer in Comparative Example 1.

Subsequently, the relation between the distance from the end part of the photo spacer 117 and the in-plane retardation of the second λ/4 plate 107 at the distance was studied for Comparative Example 1. FIG. 16 is a graph illustrating the relation between the in-plane retardation of the second λ/4 plate and the distance from the end part of the photo spacer in Comparative Example 1. Comparison between FIGS. 12 and 16 indicates that the increase tendency of the in-plane retardation of the second λ/4 plate 107 was steeper than that of the in-plane retardation of the second λ/4 plate 7 in a region (including the pixel region pr) in which the distance from the end part of the photo spacer 117 is 6.3 μm or larger. This is because the in-plane retardation of the second λ/4 plate 107 is substantially proportional to the thickness as described above with reference to FIG. 7.

Figure 17:
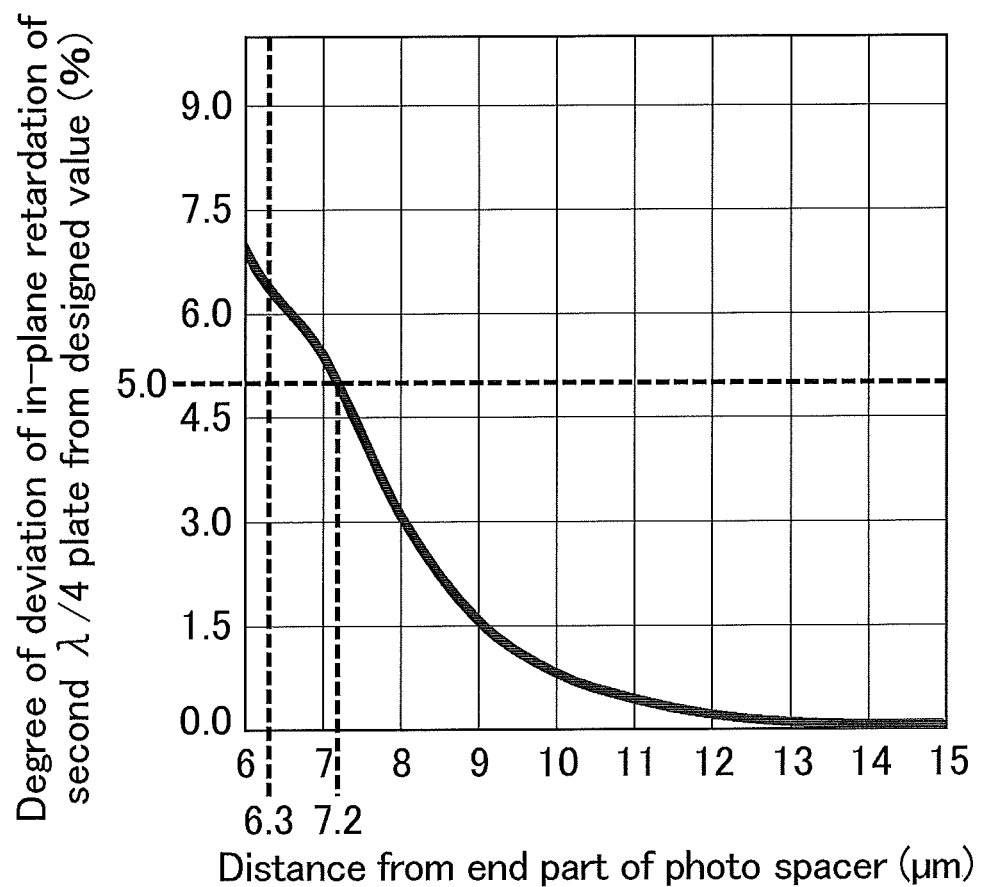
FIG. 17 is a graph derived from FIG. 16 and illustrating the relation between the degree of deviation of the in-plane retardation of the second λ/4 plate from the designed value and the distance from the end part of the photo spacer.

In addition, the degree of deviation of the in-plane retardation of the second λ/4 plate 107 from the designed value (137.5 nm) was calculated from the evaluation result illustrated in FIG. 16. FIG. 17 illustrates results of the calculation. FIG. 17 is a graph derived from FIG. 16 and illustrating the relation between the degree of deviation of the in-plane retardation of the second λ/4 plate from the designed value and the distance from the end part of the photo spacer. As illustrated in FIG. 17, the degree of deviation of the in-plane retardation of the second λ/4 plate 107 from the designed value was out of the allowable range of ±5.0% (in FIG. 17, the range of 0 to 5.0%) in part of a region (including the pixel region pr) in which the distance from the end part of the photo spacer 117 is 6.3 μm or larger. Specifically, the degree of deviation of the in-plane retardation of the second λ/4 plate 107 from the designed value was larger than 5.0% when the distance from the end part of the photo spacer 117 was smaller than 7.2 μm.

Accordingly, the in-plane retardation of the second λ/4 plate 107 largely differs between the pixel region pr and the vicinity of the photo spacer 117 when the thickness increases as the position approaches the photo spacer 117 from the pixel region pr, and light leakage in the vicinity of the photo spacer 117 cannot be reduced even when the second λ/4 plate 107 is used in combination with the black matrix 114. Light leakage in the size of several micrometers was found at a large number of places in observation of the liquid crystal display panel according to Comparative Example 1 (with no voltage application) with a polarization microscope. The contrast of the liquid crystal display panel according to Comparative Example 1 was measured to be 400 in a darkroom (environment in which the illuminance is 0.1 lx or lower), which was lower than those in Examples 1 to 3.

ADDITIONAL REMARKS

One aspect of the present invention may be a liquid crystal display panel including, sequentially from an observation surface side toward a back surface side: a first polarizing plate; a first λ/4 plate; a first substrate; a second λ/4 plate; a liquid crystal layer; a second substrate; and a second polarizing plate. One of the first substrate and the second substrate includes a pair of electrodes configured to generate a horizontal electric field at the liquid crystal layer upon voltage application. The first substrate includes a black matrix, and a photo spacer disposed on the back surface side of the black matrix and overlapping with the black matrix. Liquid crystal molecules in the liquid crystal layer homogeneously align with no voltage application between the electrodes. The second λ/4 plate is made of a self-assembling photo alignment material containing a photo functional group capable of causing at least one chemical reaction selected from the group consisting of photodimerization, photoisomerization, and photo-Fries rearrangement, and covers a side surface of the photo spacer. The in-plane slow axis of the first λ/4 plate forms an angle of 45° with the transmission axis of the first polarizing plate and is orthogonal to the in-plane slow axis of the second λ/4 plate. According to this aspect, the following effects can be achieved.

(1) Since a circular polarizing plate in which the first polarizing plate and the first λ/4 plate are stacked is disposed on the observation surface side in the liquid crystal display panel, increased visibility at a bright place is achieved by the effect of reflection prevention by the circular polarizing plate.

(2) Since the second λ/4 plate is made of a self-assembling photo alignment material, the in-plane retardation does not largely differ between a pixel region and the vicinity of the photo spacer, and thus light leakage in the vicinity of the photo spacer can be reduced when the second λ/4 plate is used in combination with the black matrix.

The transmission axis of the first polarizing plate and the transmission axis of the second polarizing plate may be orthogonal to each other. With this configuration, the first polarizing plate and the second polarizing plate are disposed in crossed Nicols, and thus a preferable black display state can be achieved with no voltage application.

The alignment direction of the liquid crystal molecules in the liquid crystal layer and the transmission axis of one of the first polarizing plate and the second polarizing plate may be parallel to each other with no voltage application between the electrodes. With this configuration, a preferable black display state can be achieved with no voltage application.

Another aspect of the present invention may be a liquid crystal display device including the liquid crystal display panel. According to this aspect, a horizontal electric field mode liquid crystal display device having excellent visibility at a bright place and reduced light leakage in the vicinity of a photo spacer can be achieved.

REFERENCE SIGNS LIST 1a, 1b: liquid crystal display device
2a, 2b, 102: liquid crystal display panel
3: backlight
4, 104: first polarizing plate
5, 105: first λ/4 plate
6a, 6b, 106: first substrate
7, 107: second λ/4 plate
8, 108: first alignment film
9, 109: liquid crystal layer
10, 110: second alignment film
11, 111: second substrate
12, 112: second polarizing plate
13, 113: first support substrate
14, 114: black matrix
15R, 15G, 15B, 115R, 115G, 115B: color filter layer
16, 116: overcoat layer
17, 117: photo spacer
18, 118: pixel electrode (signal electrode)
19, 119: insulating film
20, 120: common electrode
21, 121: second support substrate
PR, pr: pixel region
L, l: width of pixel electrode
S, s: width of slit (interval of pixel electrode)
A, a: tilt angle of pixel electrode
B, b: diameter of photo spacer
W, w: width of black matrix
Px, Py, px, py: pitch of photo spacer
Q, q: shortest distance between photo spacer and pixel region

The invention claimed is:

1. A liquid crystal display panel comprising, sequentially from an observation surface side toward a back surface side:
 a first polarizing plate;
 a first λ/4 plate;
 a first substrate;
 a second λ/4 plate;
 a liquid crystal layer;
 a second substrate; and
 a second polarizing plate,
 wherein one of the first substrate and the second substrate includes a pair of electrodes configured to generate a horizontal electric field at the liquid crystal layer upon voltage application,
 the first substrate includes a black matrix, and a photo spacer disposed on the back surface side of the black matrix and overlapping with the black matrix,
 liquid crystal molecules in the liquid crystal layer homogeneously align with no voltage application between the electrodes,
 the second λ/4 plate is made of a self-assembling photo alignment material containing a photo functional group capable of causing at least one chemical reaction selected from the group consisting of photodimerization, photoisomerization, and photo-Fries rearrangement, and covers a side surface of the photo spacer, and
 the in-plane slow axis of the first λ/4 plate forms an angle of 45° with the transmission axis of the first polarizing plate and is orthogonal to the in-plane slow axis of the second λ/4 plate.

2. The liquid crystal display panel according to claim 1, wherein the transmission axis of the first polarizing plate and the transmission axis of the second polarizing plate are orthogonal to each other.

3. The liquid crystal display panel according to claim 1, wherein the alignment direction of the liquid crystal molecules in the liquid crystal layer and the transmission axis of one of the first polarizing plate and the second polarizing plate are parallel to each other with no voltage application between the electrodes.

4. A liquid crystal display device comprising the liquid crystal display panel according to claim 1.

* * * * *